United States Patent
Itagaki et al.

(10) Patent No.: US 10,723,374 B2
(45) Date of Patent: Jul. 28, 2020

(54) TRAIN CONTROL SYSTEM

(71) Applicant: KYOSAN ELECTRIC MFG. CO., LTD., Yokohama-shi, Kanagawa (JP)

(72) Inventors: Tomonori Itagaki, Kawasaki (JP); Toshifumi Nishi, Yokohama (JP); Kenji Mizuno, Sagamihara (JP); Tamotsu Yokoyama, Yokohama (JP)

(73) Assignee: KYOSAN ELECTRIC MFG. CO., LTD., Yokohama-shi, Kanagawa (JP)

( * ) Notice: Subject to any disclaimer, the term of this patent is extended or adjusted under 35 U.S.C. 154(b) by 57 days.

(21) Appl. No.: 16/185,115

(22) Filed: Nov. 9, 2018

(65) Prior Publication Data
US 2019/0077432 A1 Mar. 14, 2019

Related U.S. Application Data

(63) Continuation of application No. PCT/JP2016/064105, filed on May 12, 2016.

(51) Int. Cl.
| | | |
|---|---|---|
| B61L 27/00 | (2006.01) | |
| B61L 23/14 | (2006.01) | |
| B61L 15/00 | (2006.01) | |

(52) U.S. Cl.
CPC ....... *B61L 27/0038* (2013.01); *B61L 15/0027* (2013.01); *B61L 23/14* (2013.01); *B61L 27/0005* (2013.01); *B61L 2027/005* (2013.01)

(58) Field of Classification Search
CPC .......... B61L 15/0027; B61L 2027/005; B61L 23/14; B61L 27/0005; B61L 25/025;
(Continued)

(56) References Cited

U.S. PATENT DOCUMENTS

| | | | | |
|---|---|---|---|---|
| 5,740,046 A | * | 4/1998 | Elestedt | B61L 25/021 340/991 |
| 5,950,966 A | * | 9/1999 | Hungate | B61L 3/125 246/167 R |

(Continued)

FOREIGN PATENT DOCUMENTS

| | | |
|---|---|---|
| CN | 104583052 A | 4/2013 |
| CN | 104583052 A | 4/2015 |

(Continued)

OTHER PUBLICATIONS

Study on Cross-Region Handover Technology for Trains and Applications thereof, Guan Jingtao, China National Database of Excellent Master's Theses, Engineering Technology II, Term S2, Dec. 15, 2013.

(Continued)

*Primary Examiner* — Mark T Le
(74) *Attorney, Agent, or Firm* — Muncy, Geissler, Olds & Lowe, P.C.

(57) ABSTRACT

A first ground apparatus performs polling communication with a train using a first train list. A second ground apparatus performs polling communication with a train using a second train list. Each ground apparatus respectively acquires train location information from the trains to be managed. The first ground apparatus notifies the second ground apparatus of a going-out notification of a boundary passing train that goes out from a first radio communication control region and comes in a second radio communication control region, and, in the case where the boundary passing train goes out from the first radio communication control region, deletes train identification information of the boundary passing train from the first train list. The second ground apparatus adds the train identification information of the boundary passing train to (Continued)

the second train list in the case where the going-out notification is input from the first ground apparatus.

4 Claims, 20 Drawing Sheets

(58) Field of Classification Search
CPC ............. B61L 15/0018; B61L 27/0088; B61L 2205/00; B61L 23/00; B61L 23/30; B61L 27/00; B61L 27/0038
See application file for complete search history.

(56) References Cited

U.S. PATENT DOCUMENTS

| | | | | |
|---|---|---|---|---|
| 6,826,402 | B1* | 11/2004 | Tran | H04W 36/30 370/331 |
| 2011/0238242 | A1* | 9/2011 | Nichter | B61L 27/0005 701/19 |
| 2014/0214248 | A1 | 7/2014 | Yamada | |
| 2015/0008293 | A1 | 1/2015 | Hatazaki | |
| 2015/0249948 | A1* | 9/2015 | Yamamoto | H04W 36/24 455/441 |
| 2017/0279636 | A1* | 9/2017 | Giroud | B61L 27/0005 |
| 2019/0077433 | A1 | 3/2019 | Itagaki et al. | |

FOREIGN PATENT DOCUMENTS

| | | |
|---|---|---|
| JP | 2007-015517 A | 1/2007 |
| JP | 2009107434 A | 5/2009 |
| JP | 2013-212713 A | 10/2013 |
| JP | 2014-031076 A | 2/2014 |
| JP | 2015-139205 A | 7/2015 |

OTHER PUBLICATIONS

Office Action of CN Patent Application 201680085661.6 dated Apr. 15, 2020 and English translation thereof.

* cited by examiner

GROUND APPARATUS INFORMATION

| GROUND APPARATUS ID | CORRESPONDING CONTROL SECTION | | RADIO COMMUNICATION CONTROL REGION | |
|---|---|---|---|---|
| | BOUNDARY LOCATION (STARTING POINT SIDE) | BOUNDARY LOCATION (END POINT SIDE) | TRACKING START LOCATION | TRACKING END LOCATION |
| XXXXX | XXX | XXX | XXX | XXX |
| XXXXX | XXX | XXX | XXX | XXX |
| XXXXX | XXX | XXX | XXX | XXX |
| ⋮ | ⋮ | ⋮ | ⋮ | ⋮ | ed along a track for performing radio communication with a train,
TRAIN CONTROL SYSTEM

CROSS REFERENCE TO RELATED APPLICATION

This application is a continuation of International Patent Application No. PCT/JP2016/064105, having an international filing date of May 12, 2016, which designated the United States, the entirety of which is incorporated herein by reference.

BACKGROUND

In related art, on-rail detection of a train has been performed using a track circuit. While, in on-rail detection using a track circuit, it is possible to always detect whether a train is on rail or not on a ground side, there is a problem that it is troublesome and expensive to install and maintain the track circuit.

Meanwhile, in recent years, an on-rail detection method utilizing radio communication has been proposed. For example, a technique is known that detects on-rail of a train on a ground side by transmitting a location of an own train measured by the train to the ground side (see JP-A-2007-15517). In this JP-A-2007-15517, a base apparatus is provided for each predetermined section (base) of a track, on-rail of a train within the base is detected (managed), and, while the base apparatus is down, coming-in and going-out of the train between bases can be recognized by an ID being read from the train that passes through a boundary of the bases.

However, with the technique of JP-A-2007-15517, to prepare for a case where a base apparatus is down, it is necessary to provide an ID detection apparatus at a boundary location of each base. That is, the technique of JP-A-2007-15517 requires to provide train detection means different from radio communication on the ground.

SUMMARY

According to one aspect of the invention, there is provided a train control system comprising a first ground apparatus and a second ground apparatus that are disposed along a track for performing radio communication with a train, the first ground apparatus and the second ground apparatus being disposed so that a first radio communication control region of the first ground apparatus and a second radio communication control region of the second ground apparatus partially overlap with each other in a portion including a boundary location, in order to prevent occurrence of a non-communication zone in the radio communication with the train that passes through the boundary location, the first ground apparatus including:

a first storage unit that stores a first train list that is a list of train identification information of trains to be managed with which the first ground apparatus can perform communication through the radio communication, and the boundary location;

a first train control unit that determines a train location of each train included in the first train list by performing the radio communication, generates first traveling control information in which a range to the boundary location is set as a coming-in allowable range of a boundary passing train that comes closer to the boundary location until a coming-in permission notification is input from the second ground apparatus, and a given location designated in the coming-in permission notification is set as the coming-in allowable range after the coming-in permission notification is input, and transmits the first traveling control information to the boundary passing train; and a going-out train control unit that notifies the second ground apparatus of a going-out notification including train identification information of the boundary passing train and deletes the train identification information of the boundary passing train from the first train list in a case where the boundary passing train has reached a given tracking end location determined ahead of the boundary location in a traveling direction, the second ground apparatus including:

a second storage unit that stores a second train list that is a list of train identification information of trains to be managed with which the second ground apparatus can perform communication through the radio communication, and the boundary location;

a coming-in train control unit that adds the train identification information of the boundary passing train to the second train list in a case where the going-out notification is input from the first ground apparatus and notifies the first ground apparatus of the coming-in permission notification in a case where the radio communication is successful with the boundary passing train; and a second train control unit that determines a train location of each train included in the second train list by performing the radio communication, generates second traveling control information in which the given location ahead of the boundary location in the traveling direction is determined as the coming-in allowable range of the boundary passing train and transmits the second traveling control information to the boundary passing train, and the boundary passing train including:

a measuring unit that measures a train location; and a traveling control unit that performs traveling control based on the first traveling control information until the train location has reached the boundary location and performs traveling control based on the second traveling control information after the train location has reached the boundary location.

BRIEF DESCRIPTION OF THE DRAWINGS

FIG. 15 illustrates a data configuration example of ground apparatus information.

DESCRIPTION OF EXEMPLARY EMBODIMENTS

Figure 1:
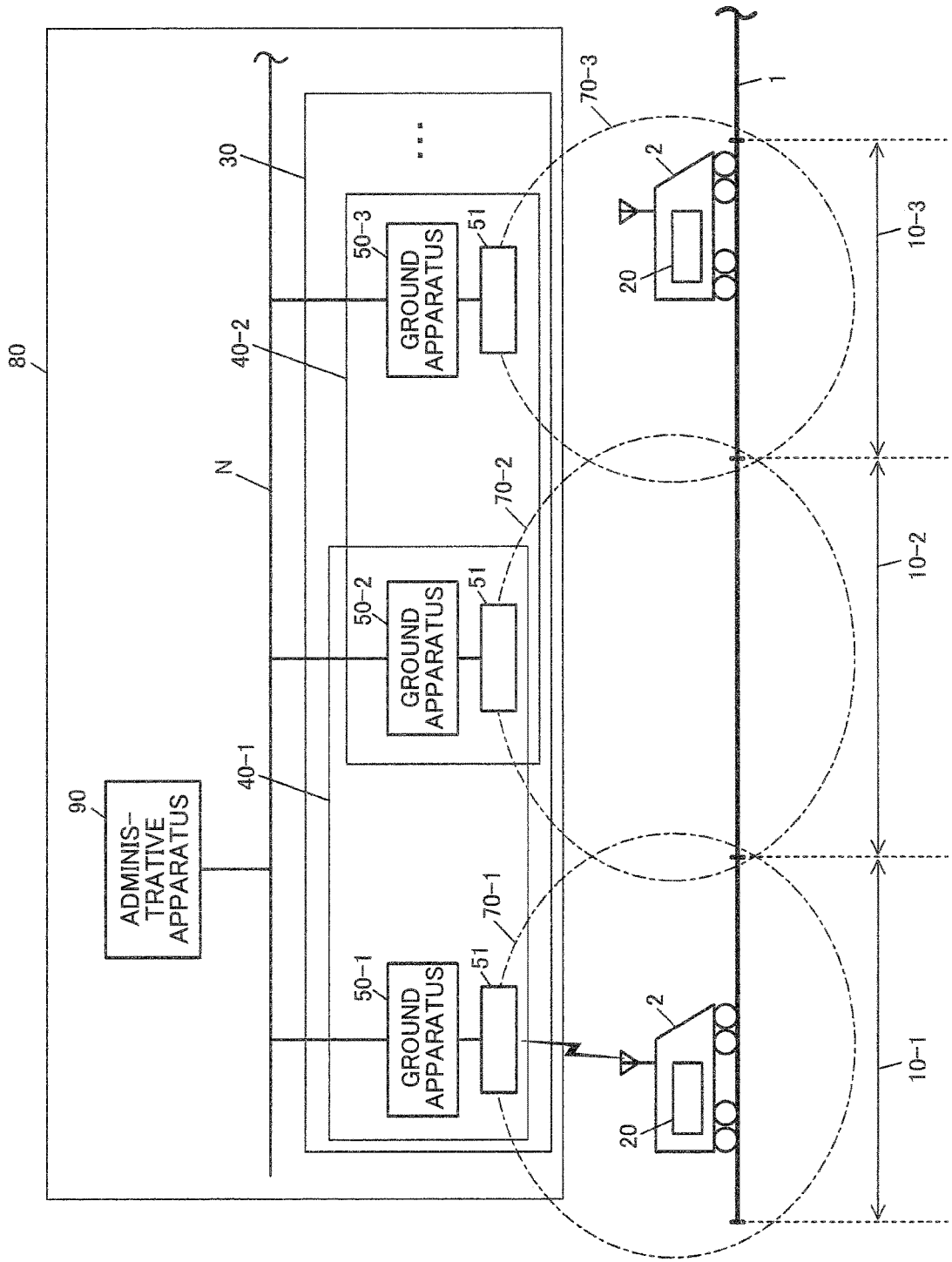
FIG. 1 illustrates an overall configuration example of an on-rail train management system.

The present invention is to propose a new method that is capable of realizing management of on-rail of a train through radio communication without train detection means being provided on the ground.

According to one embodiment of the invention, there is provided a train control system comprising a first ground apparatus and a second ground apparatus that are disposed along a track for performing radio communication with a train, the first ground apparatus and the second ground apparatus being disposed so that a first radio communication control region of the first ground apparatus and a second radio communication control region of the second ground apparatus partially overlap with each other in a portion including a boundary location, in order to prevent occurrence of a non-communication zone in the radio communication with the train that passes through the boundary location, the first ground apparatus including:

a first storage unit that stores a first train list that is a list of train identification information of trains to be managed with which the first ground apparatus can perform communication through the radio communication, and the boundary location;

a first train control unit that determines a train location of each train included in the first train list by performing the radio communication, generates first traveling control information in which a range to the boundary location is set as a coming-in allowable range of a boundary passing train that comes closer to the boundary location until a coming-in permission notification is input from the second ground apparatus, and a given location designated in the coming-in permission notification is set as the coming-in allowable range after the coming-in permission notification is input, and transmits the first traveling control information to the boundary passing train; and a going-out train control unit that notifies the second ground apparatus of a going-out notification including train identification information of the boundary passing train and deletes the train identification information of the boundary passing train from the first train list in a case where the boundary passing train has reached a given tracking end location determined ahead of the boundary location in a traveling direction, the second ground apparatus including:

a second storage unit that stores a second train list that is a list of train identification information of trains to be managed with which the second ground apparatus can perform communication through the radio communication, and the boundary location;

a coming-in train control unit that adds the train identification information of the boundary passing train to the second train list in a case where the going-out notification is input from the first ground apparatus and notifies the first ground apparatus of the coming-in permission notification in a case where the radio communication is successful with the boundary passing train; and a second train control unit that determines a train location of each train included in the second train list by performing the radio communication, generates second traveling control information in which the given location ahead of the boundary location in the traveling direction is determined as the coming-in allowable range of the boundary passing train and transmits the second traveling control information to the boundary passing train, and the boundary passing train including:

a measuring unit that measures a train location; and a traveling control unit that performs traveling control based on the first traveling control information until the train location has reached the boundary location and performs traveling control based on the second traveling control information after the train location has reached the boundary location.

With this configuration, the first ground apparatus can detect on-rail of trains to be managed by performing radio communication with each train included in the first train list in which train identification information of the trains to be managed is set. In a similar manner, the second ground apparatus can detect on-rail of trains to be managed by performing radio communication with each train included in the second train list in which train identification information of the trains to be managed is set.

Further, the first ground apparatus notifies the second ground apparatus of train identification information of the boundary passing train, and, in response to this, the second ground apparatus can add the train identification information to the second train list. Further, in the case where the boundary passing train has reached a tracking end location, the first ground apparatus can delete the train identification information of the boundary passing train from the first train list. Therefore, because the first ground apparatus can smoothly hand over management of the boundary passing train to the second ground apparatus, it is possible to realize reliable and safe on-rail train management also for a train that passes through the boundary location.

Further, for the boundary passing train, the first ground apparatus generates and transmits first train control information in which a range to the boundary location is set as a coming-in allowable range until a coming-in permission notification is input from the second ground apparatus, and after the coming-in permission notification is input, a given location designated by the coming-in permission notification is set as the coming-in allowable range. Meanwhile, the second ground apparatus generates and transmits second train control information in which a given location ahead of the boundary location in a traveling direction is determined as the coming-in allowable range. The boundary passing train is subjected to traveling control based on first traveling control information until a train location reaches the boundary location, and is subjected to traveling control based on second traveling control information after the train location reaches the boundary location. Therefore, the boundary passing train can reliably and safely travel when the boundary passing train passes through the boundary location.

In the train control system according to the second aspect of the invention, wherein, in a case where the second traveling control information cannot be received until the boundary passing train passes through the boundary location, the traveling control unit of the boundary passing train may perform stop control while setting the boundary location as a coming-in limit on the basis of the first traveling control information.

With this configuration, in the case where the boundary passing train cannot receive the second train control information when the boundary passing train comes closer to the boundary location due to lack of radio communication with the second ground apparatus, it is possible to perform control so that the boundary passing train is stopped before the boundary location in accordance with the first train control information.

In the train control system according to the third aspect of the invention, wherein the radio communication may be polling communication in which the first ground apparatus and the second ground apparatus are set as primary stations, and the train is set as a secondary station, and the traveling control unit of the boundary passing train performs stop control in a case where the polling communication is not performed with the first ground apparatus until the boundary passing train has passed through the boundary location and performs stop control in a case where the polling communication is not performed with the second ground apparatus after the boundary passing train has passed through the boundary location.

With this configuration, it is possible to perform polling communication in which the ground apparatus is set as a primary station and the train is set as a secondary station as the radio communication. Therefore, because regular communication is performed from the ground apparatus to the train, it is possible to secure continuity of on-rail train management. Further, for the train side, in the case where polling communication is not performed, because it is possible to judge that there is a possibility that the train may be excluded from the management targets, it is possible to ensure safety of traveling of a train by performing stop control.

A preferred embodiment of the invention will be described below with reference to the drawings. Note that the invention is not limited to the embodiment that will be described below, and embodiments to which the invention can be applied are not limited to the embodiment described below. Further, in description of the drawings, the same reference numerals will be assigned to the same portions.

FIG. 1 illustrates an overall configuration example of an on-rail train management system in the present embodiment. As illustrated in FIG. 1, the on-rail train management system includes an on-board apparatus 20 mounted on a train 2 that travels on a track 1, a plurality of ground apparatuses 50 (50-1, 2, 3, . . . ) that perform radio communication with the on-board apparatus 20, an administrative apparatus 90 that is connected so as to be able to perform communication and transmit and receive data with each of the ground apparatuses 50, and a network N for connecting each of the ground apparatuses 50 and the administrative apparatus 90 so as to be able to perform communication.

In the on-rail train management system, the ground apparatus 50 that is a primary station performs radio communication (polling communication) with the train 2 (actually, the on-board apparatus 20) that is a secondary station using a polling scheme. Polling communication refers to radio communication in which the primary station sequentially makes inquiries to all the secondary stations using a list (polling list) of the secondary stations, and necessary data (transmission data) is transmitted and received by the secondary stations responding to the inquiries. In the present embodiment, the ground apparatus 50 transmits ground information that is traveling control information for the train including a coming-in allowable range (that can be also referred to as a coming-in limit location) to the on-board apparatus 20 through polling communication. The on-board apparatus 20 then returns train information including train location information (a location of the own train) in response to polling from the ground apparatus 50.

The on-board apparatus 20 creates a brake pattern on the basis of the location of the own train, or the like, in accordance with the traveling control information received from the ground apparatus 50, and the coming-in allowable range included in the traveling control information and performs traveling control. The on-board apparatus 20, for example, measures the location and speed of the own train using rotation speed of an axle counted by a speed generator.

The ground apparatus 50 is disposed for each of control sections 10 (10-1, 2, 3, . . . ) obtained by dividing the track 1 at predetermined boundary locations to constitute a ground apparatus system 30, manages a train (one train or a plurality of trains) that is on-rail within the control section 10 in which the own apparatus is disposed on the basis of the train location information acquired from the on-board apparatus 20, and controls railway operation.

The ground apparatuses 50 respectively include radio base stations 51, and each of the radio base stations 51 is provided at an appropriate location along the track 1 so as not to generate a non-communication zone with the train 2 on the track 1. In the present embodiment, for sake of simplicity of description, each ground apparatus 50 includes one radio base station 51. The radio base station 51 is provided so that a radio communication control region 70 (70-1, 2, 3, . . . ) of the radio base station 51 includes the whole area of the control section (hereinafter, referred to as "corresponding control section" as appropriate) 10 in which the ground apparatus 50 is disposed, and the radio communication control regions 70 partially overlap with each other at a boundary portion with the adjacent control section 10.

The radio base station 51 provided at the ground apparatus 50 is not limited to one and may be two or more. It is only necessary that the control section 10 managed by one ground apparatus 50 can be covered by the radio communication control regions 70 of X (X≥1) radio base stations 51 provided at the ground apparatus 50. Further, the radio communication control regions 70 may be formed using loop antennas or leakage coaxial cables (LCX) laid along the track 1 instead of the radio base stations 51 being provided.

Further, the ground apparatus 50 is connected to the next ground apparatus (adjacent ground apparatus) 50 adjacent to at least a going-out side of the train 2 (a front side in a train traveling direction) so as to be able to perform communication and transmit and receive data. In the present embodiment, it is possible to constitute train control systems 40 (40-1, 2, . . . ) in a minimum unit described in the present embodiment with adjacent ground apparatuses 50. For example, the train control system 40-1 is configured with a ground apparatus (first ground apparatus) 50-1 on a rear side in the train traveling direction, and a ground apparatus (second ground apparatus) 50-2 on a front side in the train traveling direction. Of course, it is also possible to constitute the whole train control system by the system including all the ground apparatuses 50.

The administrative apparatus 90 constitutes a ground system 80 with the ground apparatus system 30, and performs management, or the like, of a train list to be used by each ground apparatus 50 to perform polling communication with the train 2.

Principle

1. On-Rail Train Detection (Polling Communication)

Figure 2:
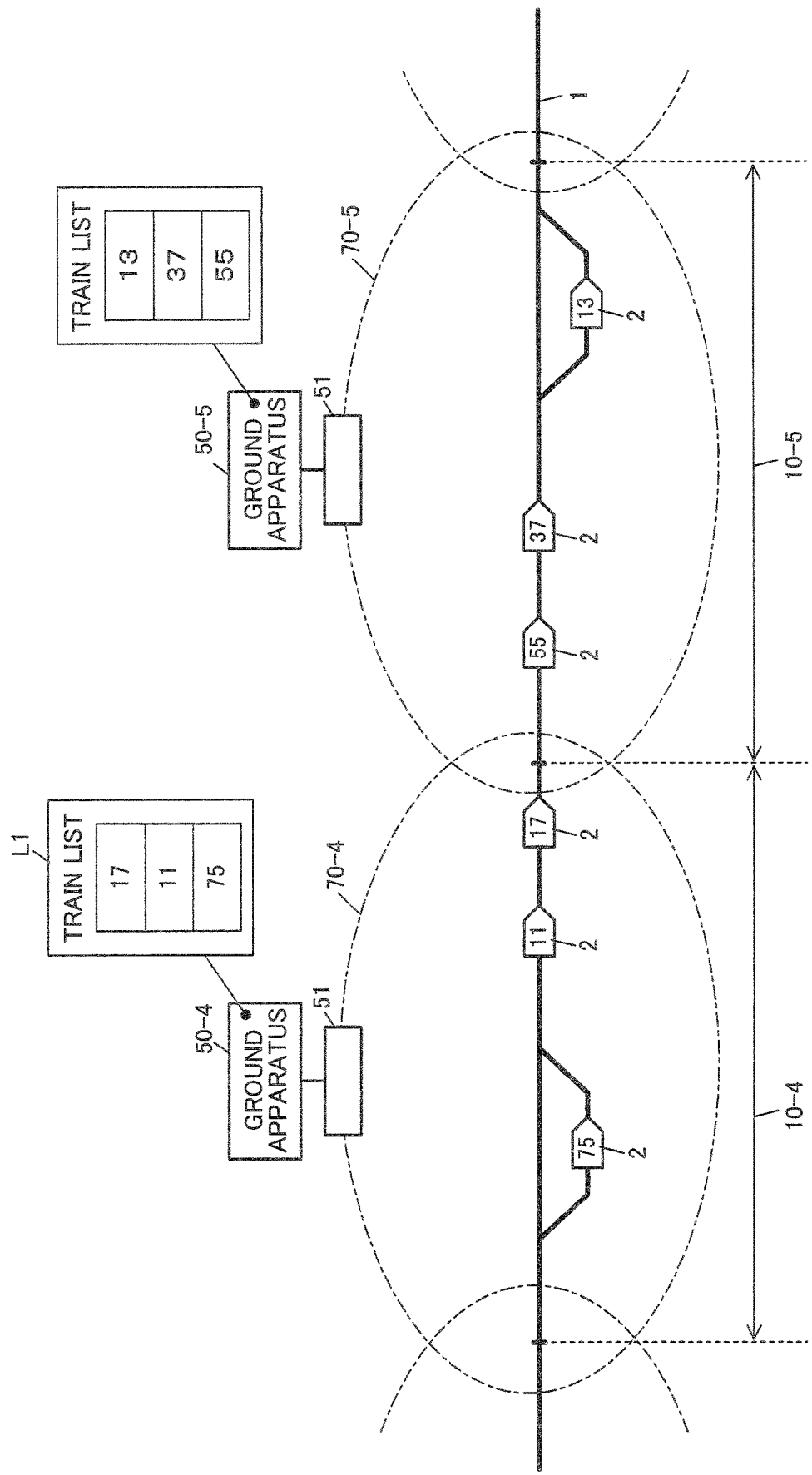
FIG. 2 illustrates an example of an on-rail state of trains in two adjacent control sections.
Figure 3:
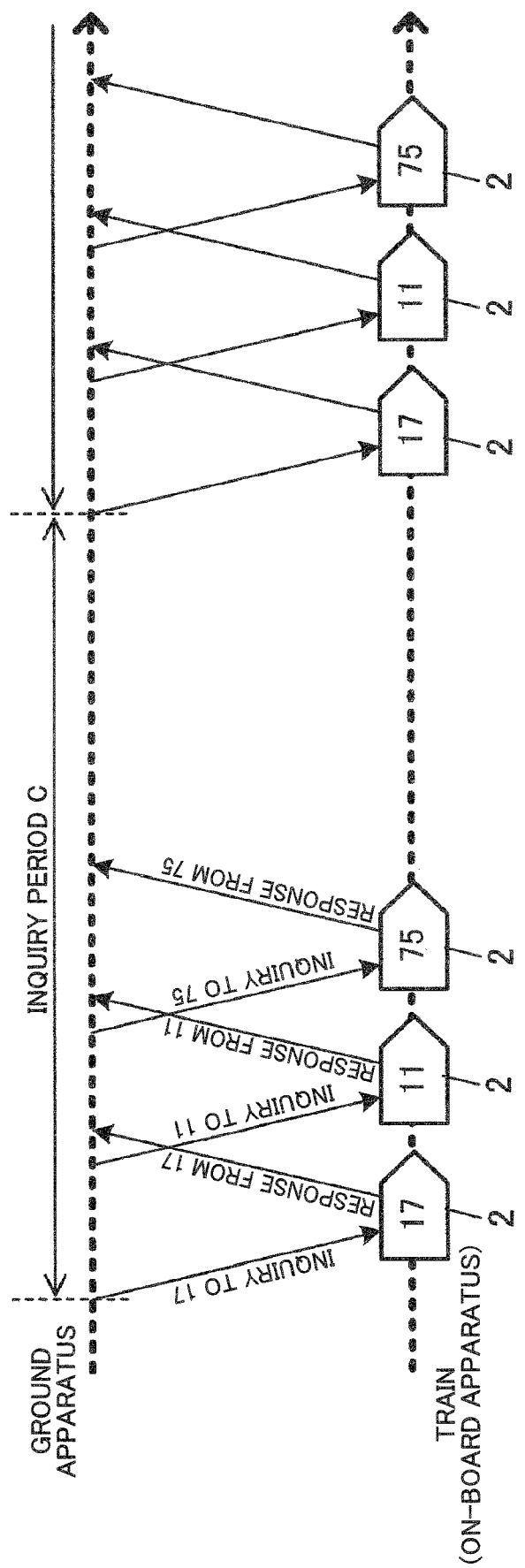
FIG. 3 illustrates a diagram explaining polling communication.

FIG. 2 illustrates an example of an on-rail state of the trains 2 in two adjacent control sections 10 (10-4 and 5). Further, FIG. 3 illustrates a diagram explaining polling communication, and illustrates polling communication in which the ground apparatus 50-4 in the control section 10-4 is set as the primary station in the on-rail state of the trains in FIG. 2.

The ground apparatuses 50 that constitute the ground apparatus system 30 hold train lists in which train IDs (train identification information) of the trains 2 to be managed by the own apparatuses at the present moment are set. Specifically, each ground apparatus 50 sets the trains 2 that can perform polling communication, that is, the trains 2 that exist within the radio communication control region 70 of the ground apparatus 50 as management targets, and generally, when the train 2 comes in the radio communication control region 70, the train ID of the train 2 is added to the train list, and when the train 2 goes out from the radio communication control region 70, the train ID is deleted from the train list. Addition and deletion to/from the train list will be described in detail later. In an example in FIG. 2, train IDs of "17", "11", and "75" of three trains 2 within the radio communication control region 70-4 are set in the train list L1 of the ground apparatus 50-4.

Each ground apparatus 50 then detects on-rail (locations) of the trains 2 in the corresponding control section 10 by periodically performing polling communication with the trains 2 to be managed with a predetermined inquiry period C using the train list as a polling list. For example, as illustrated in FIG. 3, the ground apparatus 50-4 makes inquiries by sequentially transmitting ground information respectively addressed to the trains 2 of train IDs of "17", "11", and "75" set in the train list L1 (see FIG. 2). Then, the ground apparatus 50-4 acquires train information transmitted from the on-board apparatuses 20 at the respective trains 2 of the trains ID of "17", "11", and "75" in response to the inquiries. If the train information can be acquired, it is possible to confirm existence of the trains 2 relating to the train information, and recognize locations of the trains 2 from the train location information included in the train information. The inquiry period C is set as appropriate, for example, for each second, every five seconds, or the like.

Figure 4:
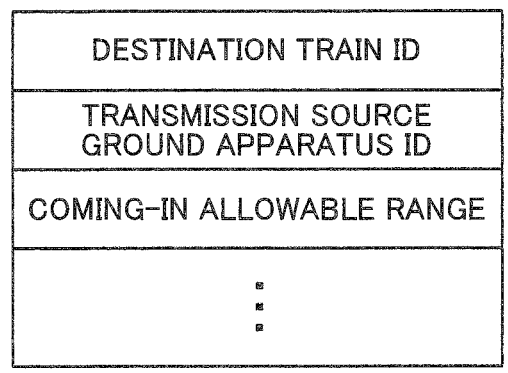
FIG. 4 illustrates a format example of ground information.
Figure 5:
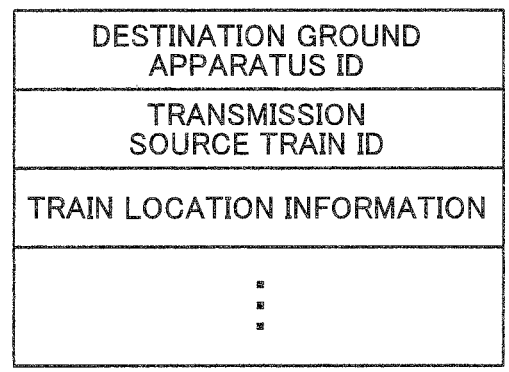
FIG. 5 illustrates a format example of train information.

FIG. 4 illustrates a format example of ground information, and FIG. 5 illustrates a format example of train information. The ground information is traveling control information for controlling traveling of a train having a destination train ID, and, as illustrated in FIG. 4, includes a destination train ID of the ground information, a transmission source ground apparatus ID of the ground information, and a coming-in allowable range that is transmission data. The coming-in allowable range indicates a coming-in range on the track 1 allowable with respect to the train 2 having the destination train ID and is calculated as, for example, a distance, or the like, ahead in the traveling direction from the location of the train 2 by the ground apparatus 50 that is management entity and that sets the train 2 as the management target. Specifically, the ground apparatus 50 determines the coming-in allowable range using a boundary location P32 (see FIG. 6) as the coming-in limit location for the train 2 for which there is no immediately preceding train 2 among the trains 2 to be managed (in other words, for the first train 2 among the trains 2 to be managed), and calculates the coming-in allowable range using a rear predetermined location of the immediately preceding train 2 (a location posteriorly away from the immediately preceding train 2 by a protection distance) as the coming-in limit location for other trains 2, as needed. Then, upon polling communication, the ground information in which the train ID of the corresponding train 2 is set as the destination train ID, which includes the coming-in allowable range of the train 2, is transmitted. Further, as illustrated in FIG. 5, the train information includes a destination ground apparatus ID of the train information, a transmission source train ID of the train information and train location information that is transmission data. The train location information is information of the train location measured by the train on a vehicle.

Note that, in the ground information and the train information, in addition to the illustrated data, necessary data such as, for example, transmission time and a CRC (Cyclic Redundancy Checking) code for error detection is set as appropriate. Data to be included in the ground information and the train information as the transmission data is set as appropriate. For example, the ground information can include other train control information that is required for the train 2 to control traveling speed of the own train, such as information of speed limit within the coming-in allowable range or within the corresponding control section 10 as appropriate, in addition to the coming-in allowable range. The train information can include, for example, composition information of the train, information of a train occupancy range, or the like, as appropriate.

As a result of polling communication that is periodically performed as described above, if there is a train 2 for which communication is interrupted within the corresponding control section 10, the ground apparatus 50 detects the train 2 as a communication interrupted train. Specifically, in the case where there is a train (communication interrupted train) 2 that does not respond to the inquiry and with which normal communication is not performed among the trains 2 that should exist within the corresponding control section 10 among the trains 2 to be managed, the train 2 is judged as the communication interrupted train. Then, assuming that there is a communication interrupted train at a train location indicated by the train location information included in the train information received through last polling communication with the train 2 or within the coming-in allowable range of the train 2, coming-in allowable ranges of other trains 2 are set. Meanwhile, on the on-board apparatus 20 side, in the case where polling communication with the ground apparatus (hereinafter, referred to as a "counterpart ground apparatus") 50 in the control section 10 in which the own train is located is not performed for a predetermined time period, it is judged that communication with the counterpart ground apparatus 50 is interrupted. That is, the on-board apparatus 20 self-judges the own train 2 as the communication interrupted train. In the case where it is judged that communication is interrupted, the train 2 is brought to an emergency stop.

According to this on-rail detection, it is possible to realize on-rail detection of the train 2 in unit of control section 10 through periodic radio communication of polling communication using the train list without train detection means being provided on the ground. Then, when there is a communication interrupted train, the ground apparatus 50 determines a train estimated range of the communication interrupted train on the basis of a location indicated by the last train location information of the communication interrupted train acquired through polling communication or a coming-in allowable range of the communication interrupted train for the communication interrupted train, and calculates and sets coming-in allowable ranges of the respective trains 2 including other trains 2 assuming that the communication interrupted train is located within the train estimated range. Meanwhile, the train 2 that does not perform polling communication for a predetermined time period is brought to an emergency stop. It is therefore possible to avoid collision of the trains 2 within the control section 10 in which there occurs a communication interrupted train, so that it is possible to realize safe railway operation control.

2. Handover (Roaming) of Train ID

Figure 6:
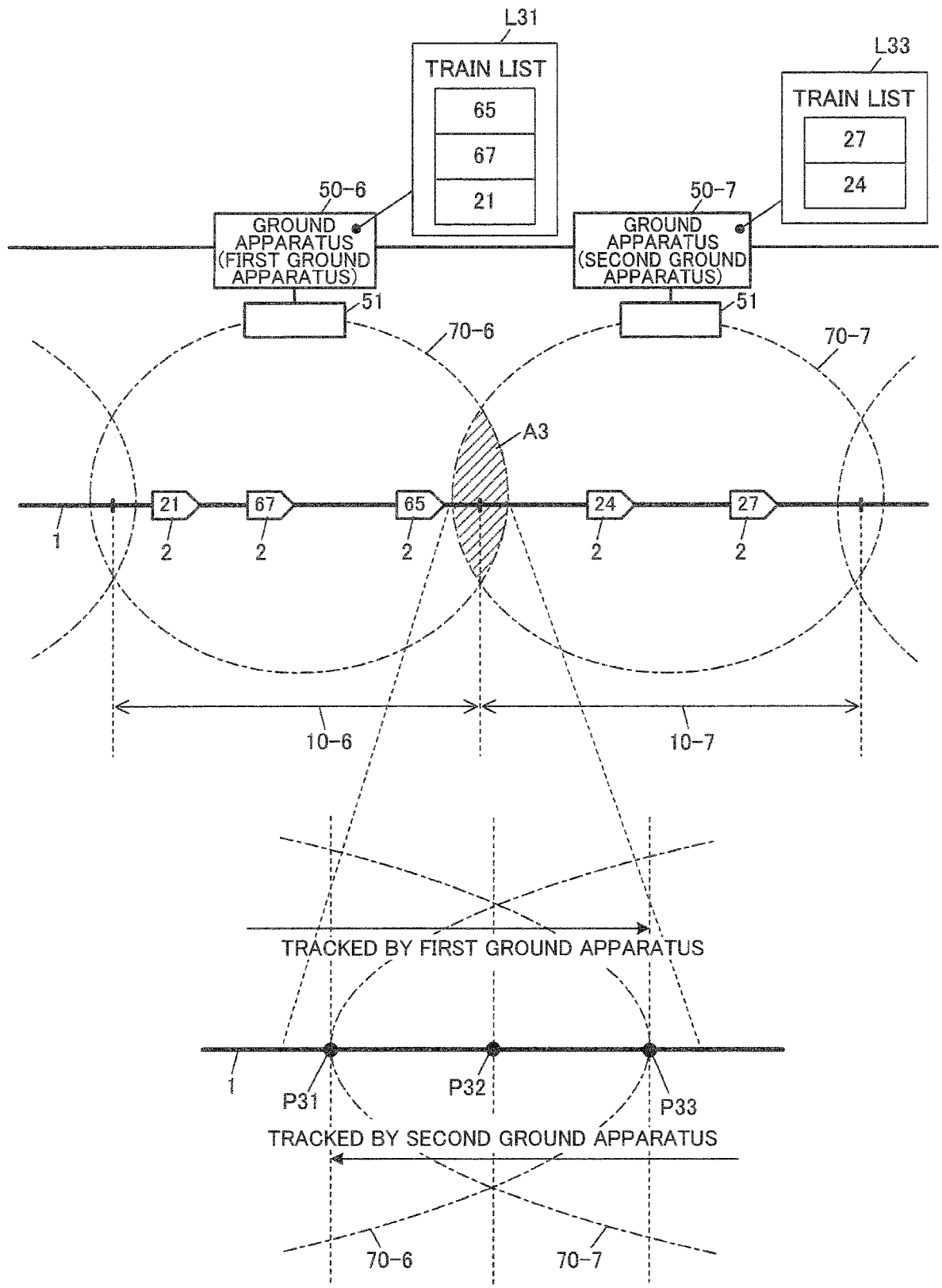
FIG. 6 illustrates another example of the on-rail state of trains in the two adjacent control sections.

As described above, the ground apparatus 50 sets the trains 2 existing within the radio communication control region 70 as the management targets, and, generally, if there is a train 2 coming in the radio communication control region 70, needs to add a train ID of the train 2 to the train list, and if there is a train 2 going out from the radio communication control region 70, needs to delete a train ID of the train 2 from the train list. Details of this will be described. FIG. 6 illustrates another example of an on-rail state of the trains 2 in two adjacent control sections 10 (10-6, 7), and illustrates an enlarged view of a region A3 in which the radio communication control region (first radio communication control region) 70-6 of the first ground apparatus 50-6 overlaps with the radio communication control region (second radio communication control region) 70-7 of the second ground apparatus 50-7.

First, the on-board apparatus 20 uses the ground information received from the counterpart ground apparatus (the ground apparatus disposed in the control section 10 in which the train 2 is traveling) 50 in traveling control, and the counterpart ground apparatus 50 changes before and after the train 2 travels across the boundary location P32 with the adjacent control section 10. Therefore, for safe railway operation, in the case where there is a train 2 that travels across the boundary location P32, that is, a roaming train 2, the second ground apparatus 50 needs to be put into a state where the second ground apparatus 50 can perform normal communication and transmit and receive transmission data with the train 2 before the train 2 travels across the boundary location P32.

Figure 7:
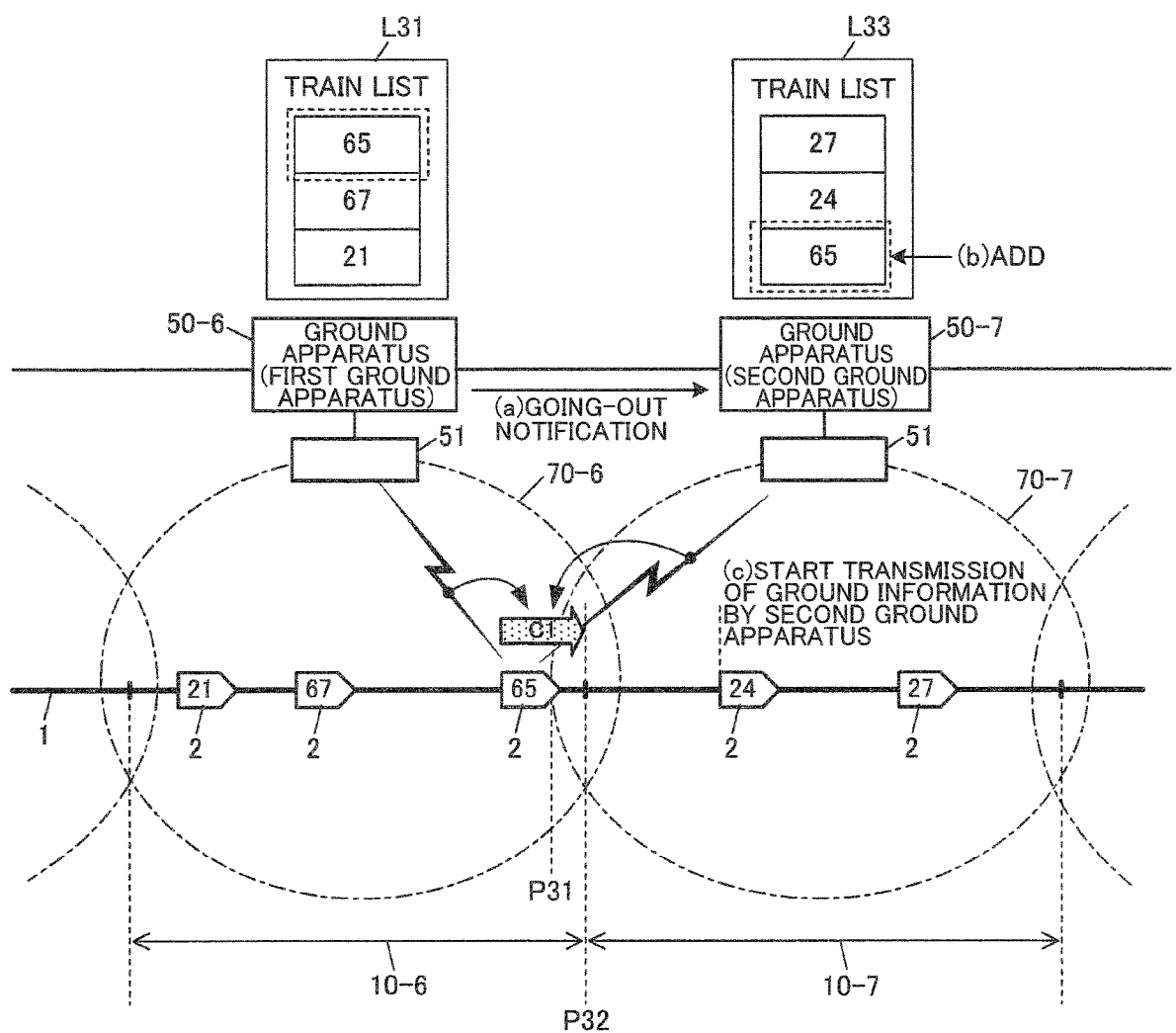
FIG. 7 illustrates a diagram explaining process of train ID handover control processing.
Figure 8:
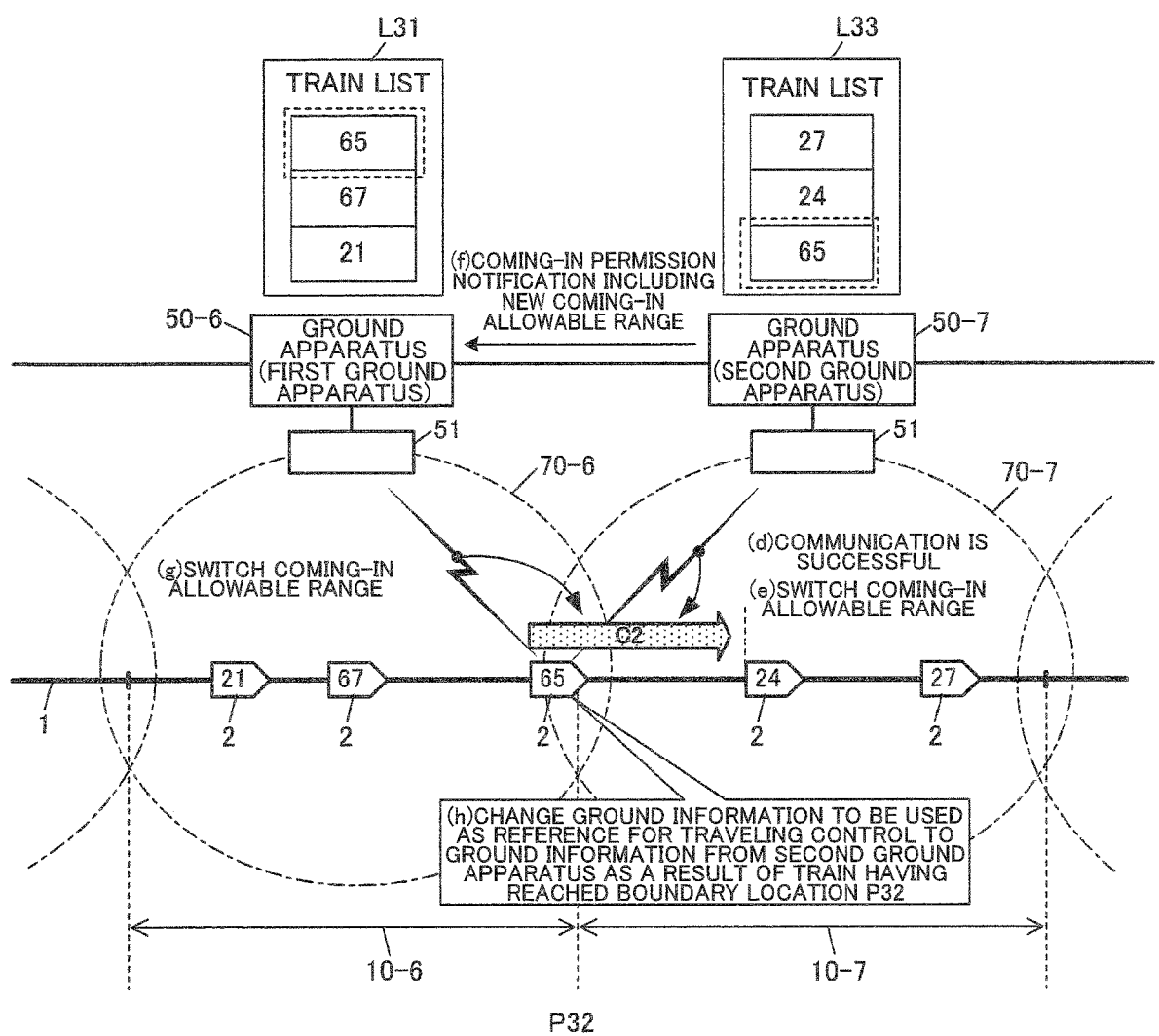
FIG. 8 illustrates another diagram explaining the process of train ID handover control processing.
Figure 9:
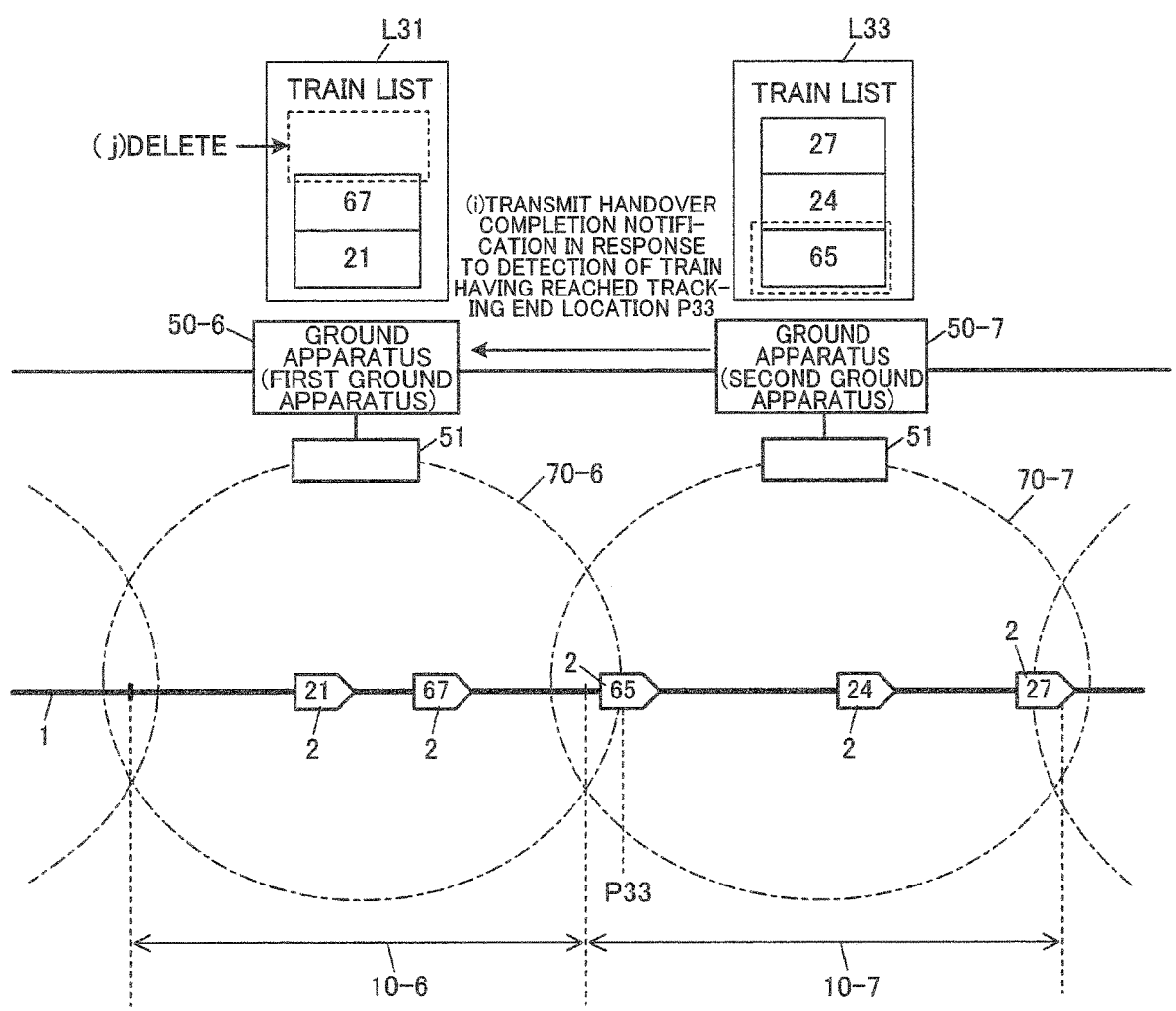
FIG. 9 illustrates another diagram explaining the process of train ID handover control processing.

Details will be sequentially described. FIG. 7 to FIG. 9 illustrate diagrams explaining process of train ID handover control processing. First, the first ground apparatus 50-6 detects a train 2 that has reached a tracking start location P31 of the second ground apparatus 50-7 as a boundary passing train 2 that comes closer to the boundary location P32 on the basis of the train location information acquired through polling communication with the train 2 to be managed. Then, as illustrated in FIG. 7, when the first ground apparatus 50-6 detects the boundary passing train 2, the first ground apparatus 50-6 (a) transmits an ID handover notification including a train ID of "65" of the train 2 to the second ground apparatus 50-7 as a going-out notification. Note that, in actual operation, the going-out notification is transmitted assuming that required conditions such as a condition that the boundary passing train 2 is allowed to come in the next control section 10 (here, 10-7) and a condition that the second ground apparatus 50-7 normally operates, are satisfied.

Meanwhile, the second ground apparatus 50-7 that receives the going-out notification, (b) adds the train ID of "65" in the going-out notification to the second train list L33.

At this time point, the train ID of "65" of the boundary passing train 2 is set in the train list (first train list) L31 of the first ground apparatus 50-6 and the train list (second train list) L33 of the second ground apparatus 50-7 in an overlapped manner. Therefore, the ground information is transmitted from the first ground apparatus 50-6 to the boundary passing train 2, and (c) transmission of the ground information (an inquiry as to polling communication) also from the second ground apparatus 50-7 to the boundary passing train 2 is started. However, in the coming-in allowable range C1 included in the ground information transmitted from the second ground apparatus 50-7, the boundary location P32 is set as the coming-in limit location in a similar manner to the coming-in allowable range C1 included in the ground information transmitted from the first ground apparatus 50-6.

Meanwhile, the boundary passing train 2, which is performing polling communication with the first ground apparatus 50-6, also receives an inquiry as to polling communication from the second ground apparatus 50-7. The boundary passing train 2 starts to respond to the second ground apparatus 50-7, and performs polling communication with the both apparatuses. However, because a traveling location measured by the boundary passing train 2 itself does not reach the boundary location P32, the ground information from the first ground apparatus 50-6 is used as the ground information to be used as reference for traveling control. That is, because the boundary passing train 2 is traveling within the control section 10-6 of the first ground apparatus 50-6, traveling control is performed on the basis of the ground information from the first ground apparatus 50-6.

By this means, in the case where the boundary passing train 2 comes closer to the boundary location P32, but cannot receive the ground information from the second ground apparatus 50-7, that is, the second ground apparatus 50-7 cannot perform polling communication with the boundary passing train 2 having the train ID of "65" for some reasons, the boundary passing train 2 is controlled to stop before the boundary location P32 on the basis of the coming-in allowable range C1 included in the ground information from the first ground apparatus 50-6. Therefore, in the case where there occurs inconvenience in handover of train management, safety is secured by preventing the boundary passing train 2 from coming in the control section 10 of the second ground apparatus that cannot perform polling communication.

Referring to FIG. 8, when (d) polling communication is safely successful by an inquiry being made by the second ground apparatus 50-7 and a reply being sent by the boundary passing train 2, and polling communication is started between the second ground apparatus 50-7 and the boundary passing train 2, (e) the second ground apparatus 50-7 switches the coming-in allowable range to be included in the ground information to be transmitted so that a given location ahead of the boundary location P32 in the traveling direction is set as the coming-in limit location. That is, an immediately preceding train 2 seen from the boundary passing train 2 is selected among the trains 2 that are to be managed by the second ground apparatus 50-7, and that are traveling within the control section 10-7 of the second ground apparatus 50-7, and a coming-in allowable range C2 of the boundary passing train 2 is determined using a rear predetermined location of the selected train 2 (a location posteriorly away from the immediately preceding train 2 by a protection distance) as the coming-in limit location of the boundary passing train 2. If there is no train 2 to be managed by the second ground apparatus 50-7, and a route is not clear, the coming-in allowable range of the boundary passing train 2 is determined using a boundary location of an end (a right end in FIG. 8) of the control section 10-7 of the second ground apparatus 50-7 in the traveling direction as the coming-in limit location of the boundary passing train 2.

Then, (f) the second ground apparatus 50-7 transmits a coming-in permission notification to the control section 10-7 of the second ground apparatus 50-7 relating to the boundary passing train 2, including information of the switched new coming-in allowable range C2, to the first ground apparatus 50-6. Then, (g) the first ground apparatus 50-6 switches the coming-in allowable range of the ground information to be transmitted to the coming-in allowable range C2 included in the coming-in permission notification received from the second ground apparatus 50-7.

During this time, the boundary passing train 2 performs polling communication with the first ground apparatus 50-6 and the second ground apparatus 50-7. However, because the traveling location measured by the boundary passing train 2 itself does not reach the boundary location P32, the ground information from the first ground apparatus 50-6 is used as the ground information to be used as reference for traveling control. Therefore, in the case where polling communication (radio communication) between the boundary passing train 2 and the second ground apparatus 50-7 is successful, and a coming-in permission notification is made from the second ground apparatus 50-7 to the first ground apparatus 50-6, the coming-in allowable range to be included in the ground information from the first ground apparatus 50-6 is automatically switched from C1 to C2, that is, switched ahead of the boundary location P32 in the traveling direction.

Then, (h) when it is determined that the measured traveling location of the boundary passing train 2 reaches the boundary location P32, the ground information to be used as reference for traveling control is changed to the ground information from the second ground apparatus 50-7. This is because the boundary passing train 2 comes in the control section 10-7 of the second ground apparatus 50-7.

Thereafter, when the second ground apparatus 50-7 detects (judges) that the boundary passing train 2 has reached the tracking end location P33 from the train location information included in the train information of the boundary passing train 2, received through polling communication, as illustrated in FIG. 9, (i) the second ground apparatus 50-7 transmits a handover completion notification that indicates that handover (roaming) of the train ID of "65" of the boundary passing train 2 is completed to the first ground apparatus 50-6.

The first ground apparatus 50-6 that receives the handover completion notification, (j) deletes the train ID of "65" of the boundary passing train 2 from the train list L31. By this means, the train 2 having the train ID of "65" is excluded from the management targets of the first ground apparatus 50-6, and handover of management of the boundary passing train 2 (train ID handover control processing), which passes through a section boundary (boundary location P32) is completed.

Note that transmission of the handover completion notification is not limited to transmission from the second ground apparatus 50-7 to the first ground apparatus 50-6, and, for example, the handover completion notification may be transmitted from the boundary passing train 2. In this case, the boundary passing train 2 detects that the boundary passing train 2 has reached the tracking end location P33 on the basis of the location of the own train, and, when the boundary passing train 2 detects that the train 2 has reached the tracking end location P33, the train 2 transmits a handover completion notification to the first ground apparatus 50-6. Meanwhile, the first ground apparatus 50-6 receives the handover completion notification from the boundary passing train 2 and deletes the train ID from the train list. Alternatively, the first ground apparatus 50-6 may judge completion of handover from soundness of the second ground apparatus 50-7 and the location of the boundary passing train 2, and process of handover completion notification may be omitted. The soundness of the second ground apparatus 50-7 can be judged from a state of communication with the second ground apparatus 50-7 until the preceding process, or the like. In this case, in the case where the first ground apparatus 50-6 judges that handover is completed, the first ground apparatus 50-6 deletes the train ID of the boundary passing train 2 from the train list.

Through the train ID handover control processing described above, it is possible to hand over the train ID of the boundary passing train 2 that travels across the boundary location P32 of the control sections 10-6 and 10-7 from the first ground apparatus 50-6 to the second ground apparatus 50-7.

The first ground apparatus 50-6 notifies the second ground apparatus 50-7 of the train ID of the boundary passing train 2, and the second ground apparatus 50-7 that receives the notification, can add the train ID to the train list. Further, in the case where a handover completion notification is input from the second ground apparatus 50-7, the first ground apparatus 50-6 can delete the train ID of the boundary passing train 2. Therefore, because it is possible to smoothly hand over management of the boundary passing train 2 from the first ground apparatus 50-6 to the second ground apparatus 50-7, it is possible to realize reliable and safe on-rail train management for a train that passes through the boundary location P32.

Further, for the boundary passing train 2, the first ground apparatus 50-6 generates and transmits ground information in which a range to the boundary location P32 is set as the coming-in allowable range C1 until the coming-in permission notification is input from the second ground apparatus 50-7, and a given location designated by the coming-in permission notification is set as the coming-in allowable range C1 after the coming-in permission notification is input. Meanwhile, the second ground apparatus 50-7 generates and transmits ground information in which a range to the boundary location P32 is set as the coming-in allowable range until polling communication (radio communication) with the boundary passing train 2 is successful, and a given location ahead of the boundary location P32 in the traveling direction is determined after the polling communication is successful. Traveling control of the boundary passing train 2 is performed on the basis of the ground information from the first ground apparatus 50-6 until the traveling location (location of the train) has reached the boundary location P32, and traveling control is performed on the basis of the ground information from the second ground apparatus 50-7 after the traveling location has reached the boundary location P32. Therefore, the boundary passing train 2 can reliably and safely travel when the boundary passing train 2 passes through the boundary location P32.

3. Management of Train List

Figure 10:
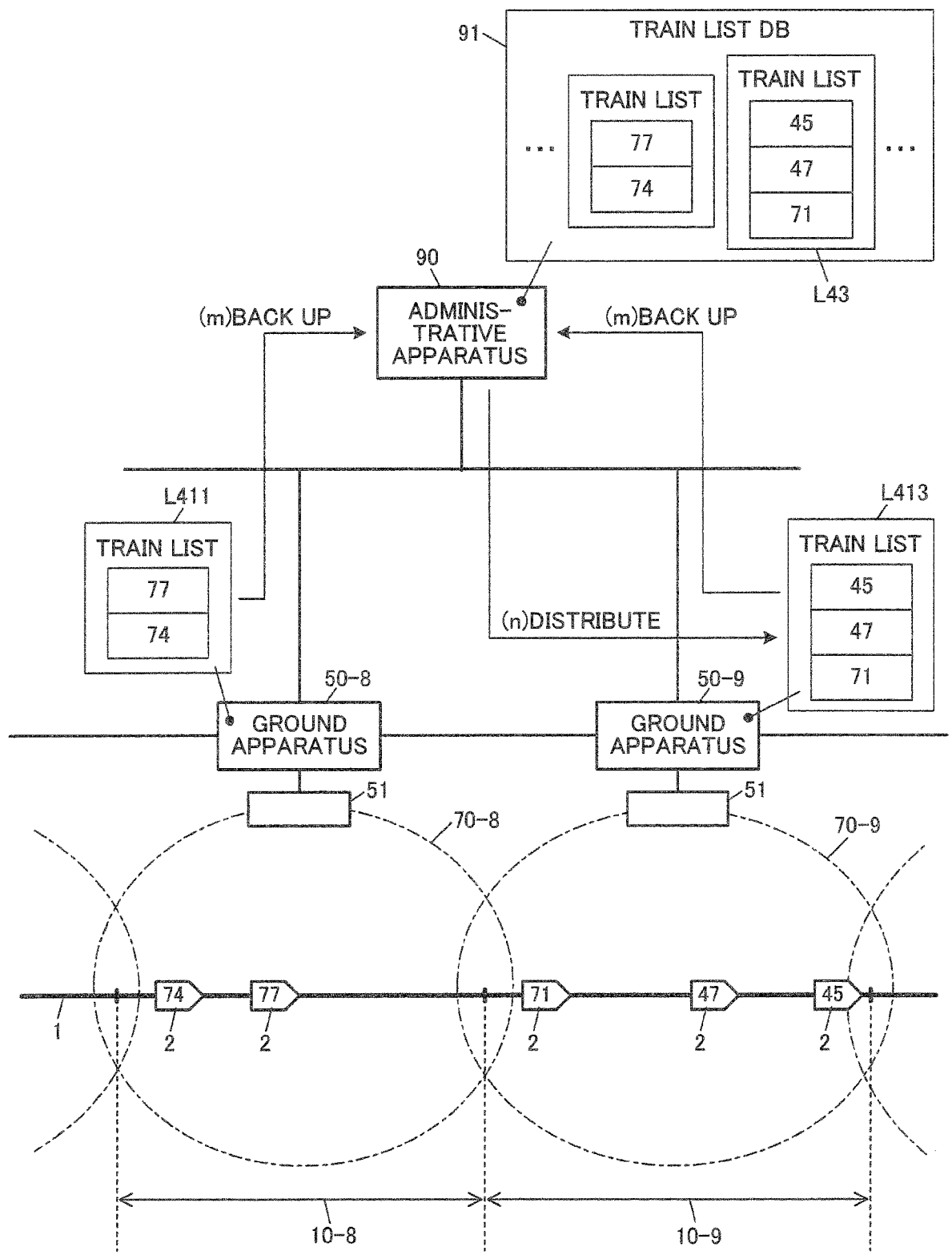
FIG. 10 illustrates a diagram explaining management of a train list.

FIG. 10 illustrates a diagram explaining management of the train list, and illustrates another example of the on-rail state of the trains 2 in the two adjacent control sections 10 (10-8, 9). For safe railway operation, it is necessary to recognize and reliably track all the trains 2 on the track 1. Therefore, in the on-rail train management system of the present embodiment, it is essential that the train list held by each ground apparatus 50 matches an actual on-rail state of the trains 2 in the corresponding control section 10. If the train list is appropriate, the locations of the trains 2 can be acquired through polling communication. Therefore, upon start-up of the ground apparatus system 30 (that is, in the case where all the ground apparatuses 50 are started up) such as when the ground apparatus system 30 is powered on prior to start of operation of the first train in the morning, or upon individual start-up of the ground apparatus 50 such as when the ground apparatus 50 is restarted by maintenance, or the like, and when the ground apparatus 50 is started up by exchange, or the like, of the ground apparatus 50 due to a failure, it is necessary to confirm whether the train list held by the ground apparatus 50 is appropriate.

However, in on-rail detection of the present embodiment that utilizes polling communication, it is difficult for the ground apparatus 50 to judge whether or not the train list is appropriate with the own apparatus alone. For example, in the case where there is a train 2 that does not respond to an inquiry as a result of polling communication using the train list, it is difficult to discern whether this is due to an abnormality of communication, or the like, or due to the train 2 not existing within the corresponding control section 10. Further, even if a train 2 having a train ID not included in the train list is located within the corresponding control section 10, because the train ID is not registered in the train list, the ground apparatus 50 cannot make an inquiry to the train 2. Meanwhile, visual confirmation of the on-rail state every time the ground apparatuses 50 are started up such as when the ground apparatus system 30 is started up and when the ground apparatuses 50 are individually started up increases burden on an observer. Still more, manual creation of the train list from the confirmed on-rail state may lead to human errors.

Therefore, as illustrated in FIG. 10, each ground apparatus 50 (for example, the ground apparatuses 50-8, 9) (m) transmits (backs up) train lists L411 and L413 to the administrative apparatus 90 as needed. Backup is performed at least upon updating of the train lists.

Meanwhile, the administrative apparatus 90 manages the latest train list transmitted from each ground apparatus 50 as a train list DB 91. The train list DB 91 stores the train lists transmitted from the ground apparatuses 50 in which the ground apparatuses ID of the respective ground apparatuses 50 are associated with date and time at which the train lists are transmitted from the ground apparatuses 50. Further, the administrative apparatus 90 holds all on-rail train information 972 (see FIG. 13) in which all train IDs of the trains existing on the track 1 are set, which is used for determining whether or not the train list is appropriate upon start-up of the ground apparatus 50.

In this manner, by the train lists of all the ground apparatuses 50 being managed at the administrative apparatus 90, it is possible to prepare for a case where the train list of the ground apparatus 50 disappears for some reasons, or for exchange of the ground apparatus 50, or the like. Further, it is possible to prevent a case where the ground apparatus 50 performs polling communication using an old train list.

Specifically, in the present embodiment, the administrative apparatus 90 (n) distributes a train list L43 of the ground apparatus 50-9 managed in a train list DB 91 to the ground apparatus 50-9 when, for example, the ground apparatus 50-9 is individually started up. In response to this, the ground apparatus 50-9 rewrites a train list L413 stored within the apparatus with the distributed train list L43. That is, in the case where the ground apparatus 50 is started up, the train list is always rewritten with the train list distributed from the administrative apparatus 90. Therefore, regardless of whether or not the train list disappears, it is possible to reset the train list in a backed up latest state.

More specifically, first, the administrative apparatus 90 distributes the train list to the ground apparatus 50 to be started up. Upon start-up of the ground apparatus system 30, all the ground apparatuses 50 are to be started up, and the administrative apparatus 90 distributes the corresponding train lists to all the ground apparatuses 50. Meanwhile, in the case where a single ground apparatus 50 is individually started up, the corresponding train list is distributed to the ground apparatus 50 to be started up. Then, the ground apparatus 50 to be started up repeats polling communication on the basis of the train list after rewriting the train list with the distributed train list. Then, in the case where there are replies of train information from all the trains 2 having train IDs set in the train list, and normal communication is performed, preparation completion signals including the train IDs of the trains 2 that send the replies (transmission source train IDs of train information of all the trains that send the replies, hereinafter, referred to as "reply receipt train IDs") are transmitted to the administrative apparatus 90.

Then, in the case where the administrative apparatus 90 receives the preparation completion signals from the ground apparatus 50 to be started up, the administrative apparatus 90 confirms existence of (checks) all the trains existing on the track 1 using the all on-rail train information 972. Upon start-up of the ground apparatus system 30, preparation completion signals are received from all the ground apparatuses 50. Therefore, upon start-up of the ground apparatus system 30, whether each of all the train IDs set in the all on-rail train information 972 is certainly included in one of the preparation completion signals as the reply receipt train ID is confirmed as confirmation of existence of all the trains. Meanwhile, upon individual start-up of the ground apparatus 50, a preparation completion signal is received from only the ground apparatus 50 to be started up. Therefore, for the ground apparatuses 50 other than the ground apparatus 50 to be started up, the train lists of the ground apparatuses 50 that are read out from the train list DB 91 are used, and whether all the train IDs set in the all on-rail train information 972 are certainly included as the reply receipt train ID of the received preparation completion signal or the train IDs in the read train lists is confirmed as confirmation of existence of all the trains. In both cases, if existence can be confirmed, the administrative apparatus 90 transmits an operation permission signal to the ground apparatus 50 to be started up, and the ground apparatus 50 to be started up transmits a traveling permission signal to each of the trains 2 to be managed in response to the operation permission signal.

By this means, upon start-up of the ground apparatus 50 such as upon start-up of the ground apparatus system 30 and upon individual start-up of the ground apparatus 50, it is possible to prevent a case where operation is started/restarted in a state where the train list does not match an actual on-rail state and there is a train whose existence is unknown.

Functional Configuration

1. Ground Apparatus

Figure 11:
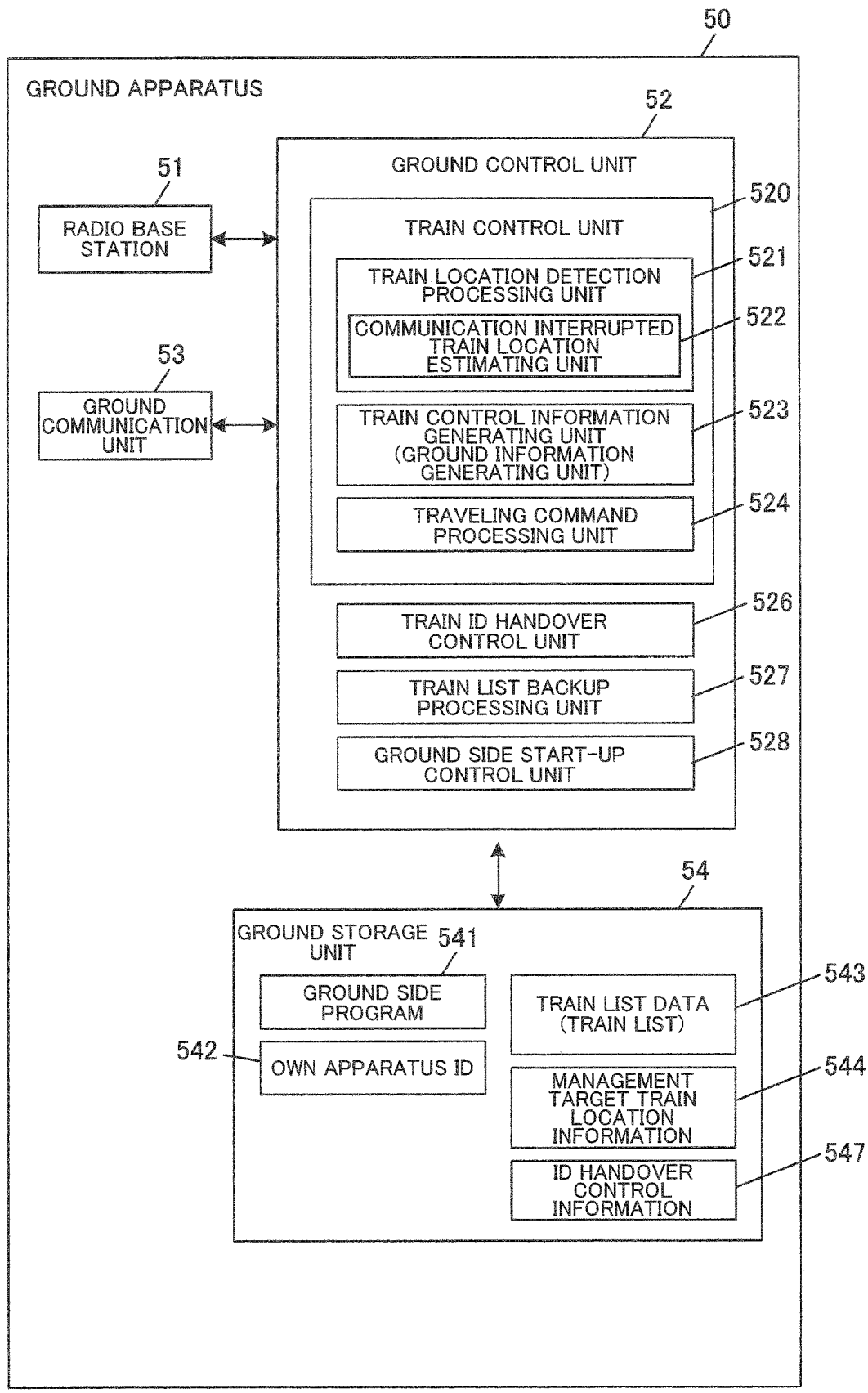
FIG. 11 illustrates a block diagram of a functional configuration example of a ground apparatus.

FIG. 11 illustrates a block diagram of a functional configuration example of the ground apparatus 50. As illustrated in FIG. 11, the ground apparatus 50 is one type of a computer control apparatus including a radio base station 51 provided at an appropriate position close to the track 1, a ground control unit 52, a ground communication unit 53 and a ground storage unit 54, and an operating unit and a display unit that are not illustrated.

The ground control unit 52 is configured to include, for example, an arithmetic apparatus and an arithmetic circuit such as a CPU (Central Processing Unit) and an FPGA (Field Programmable Gate Array), and comprehensively controls operation of the ground apparatus 50 by issuing an instruction and transferring data to respective components constituting the ground apparatus 50 on the basis of programs and data stored in the ground storage unit 54, and data, or the like, received from the on-board apparatus 20 (train 2), other ground apparatuses 50 and the administrative apparatus 90. The ground control unit 52 includes a train control unit 520, a train ID handover control unit 526, a train list backup processing unit 527 and a ground side start-up control unit 528. Each functional unit provided at the ground control unit 52 may be implemented with individual arithmetic circuits, or may be individually implemented by the arithmetic circuits through software arithmetic processing.

The train control unit 520 further includes a train location detection processing unit 521, a train control information generating unit 523 and a traveling command processing unit 524. The train location detection processing unit 521 performs polling communication with the train 2 to be managed with a predetermined inquiry period using the train list 543 to detect a train location of the train 2 in the corresponding control section 10. The train location detection processing unit 521 includes a communication interrupted train location estimating unit 522. In the case where there is a communication interrupted train within the corresponding control section 10 as a result of the polling communication, the communication interrupted train location estimating unit 522 estimates a range (communication interrupted train range) on the track 1, in which the communication interrupted train can be located, using a location (previous location) of the communication interrupted train recognized as a result of previous polling communication.

The train control information generating unit 523 calculates a coming-in allowable range of each train 2 to be managed using the train location of each train 2 to be managed and information of a section boundary of a target control, and generates ground information that is traveling control information of each train 2. The train control information generating unit 523 can be also referred to as a ground information generating unit.

The traveling command processing unit 524 transmits a command signal for an emergency stop or transmits a stand-by command to a train 2 that stops when it is necessary to stop each train 2 to be managed for some reasons.

The train ID handover control unit 526 performs processing for adding a train ID of the train 2 that comes in the radio communication control region 70 to the train list 543, and, in the case where a handover completion notification is received from the ground apparatus 50 on a going-out side, deleting a train ID of the train 2 that goes out from the radio communication control region 70 (boundary passing train) from the train list 543. In the present embodiment, the train ID handover control unit 526 detects a train 2 that has reached the tracking start location P31 of the second ground apparatus 50 adjacent to the own apparatus that is the first ground apparatus 50 on a train going-out side, as a boundary passing train 2 that comes closer to the boundary location P32. Then, in the case where the boundary passing train 2 is detected, a going-out notification including the train ID is transmitted to the second ground apparatus 50. Thereafter, in the case where a coming-in permission notification including a new coming-in allowable range is received (input) from the second ground apparatus 50, the coming-in allowable range to be included in the ground information to be transmitted is switched to the new coming-in allowable range input from the second ground apparatus 50. Then, in the case where a handover completion notification is received from the second ground apparatus 50, the train ID is deleted from the train list 543.

Further, in the case where a going-out notification is received from the first ground apparatus 50 adjacent to the own apparatus that is the second ground apparatus 50 on a train coming-in side, the train ID handover control unit 526 adds a train ID in the going-out notification to the train list 543. Then, an inquiry about polling communication is started by starting transmission of the ground information in which the coming-in allowable range is set at a range to the boundary location P32 to the boundary passing train 2. In the case where there is a reply from the boundary passing train 2, it is judged that polling communication with the boundary passing train 2 is successful, and polling communication is continued thereafter, and the coming-in allowable range of the ground information to be transmitted is switched to a given location ahead of the boundary location P32 in the traveling direction. Further, a coming-in permission notification including information of the switched new coming-in allowable range is transmitted to the first ground apparatus 50. Then, in the case where it is judged that the train 2 has reached a tracking end location P33, a handover completion notification is transmitted to the first ground apparatus 50.

The train list backup processing unit 527 transmits the train list 543 to the administrative apparatus 90 as needed. It is preferable to transmit at least the train list 543 to the administrative apparatus 90 upon updating of the train list 543 when the train list 543 is updated as a result of a train ID being added to the train list 543 or a train ID being deleted from the train list 543.

The ground side start-up control unit 528 rewrites the train list 543 with the train list distributed from the administrative apparatus 90 upon start-up of the own apparatus, and performs polling communication using the rewritten train list 543. Then, when there are replies of the train information from the trains 2 of all the train IDs set in the train list 543, preparation completion signals including the train IDs (reply receipt train IDs) of all the trains 2 that send the replies are transmitted to the administrative apparatus 90. Further, in the case where operation permission signals are received from the administrative apparatus 90 thereafter, traveling permission signals addressed to all the train IDs set in the train list 543 are transmitted. Note that it is also possible to make setting such that approval operation by a staff is required when the traveling permission signals are transmitted.

The ground communication unit 53 is a wired or wireless communication apparatus that is implemented with, for example, a wireless communication module, a router, a modem, a TA, a jack of a wired communication cable, a control circuit, or the like, and performs communication with external apparatuses (in the present embodiment, other ground apparatuses 50 and the administrative apparatus 90).

The ground storage unit 54 is implemented with a storage medium such as an IC memory, a hard disk and an optical disk. In the ground storage unit 54, programs for causing the ground apparatus 50 to operate and realizing various functions provided at the ground apparatus 50, and data, or the like, to be used during execution of the programs, are stored. In the present embodiment, in the ground storage unit 54, a ground side program 541, an own apparatus ID 542, train list data (train list) 543, management target train location information 544 and ID handover control information 547 are stored.

The ground control unit 52 implements functions of the train control unit 520, the train ID handover control unit 526, the train list backup processing unit 527, the ground side start-up control unit 528, or the like, by reading out and executing the ground side program 541 from the ground storage unit 54. In the own apparatus ID 542, a ground apparatus ID of the own apparatus is set. In the train list 543, train IDs of the trains 2 to be managed are set.

Figure 12:
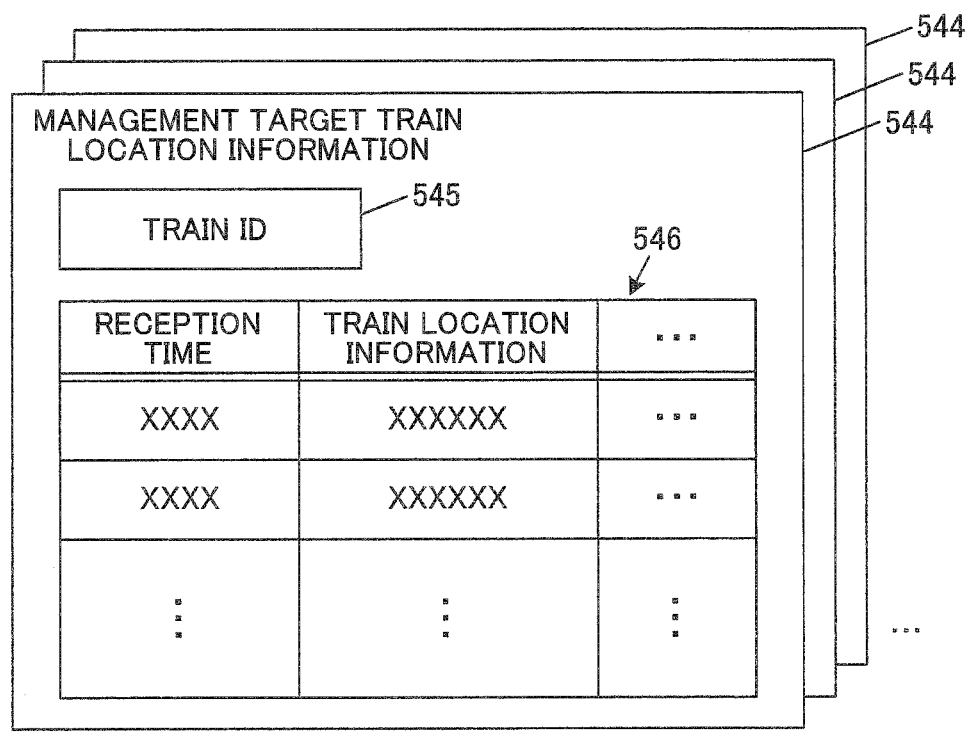
FIG. 12 illustrates a data configuration example of management target train location information.

The management target train location information 544 stores locations of the trains 2 to be managed, recognized as a result of polling communication. FIG. 12 illustrates a data configuration example of the management target train location information 544. As illustrated in FIG. 12, the management target train location information 544 is prepared for each train ID 545 of the train 2 to be managed, and is set as reception history 546 of the train location information that has been acquired from the corresponding train 2 until previous polling communication. Note that, in the case where transmission data other than the train location information is acquired from the on-board apparatus 20, the transmission data is also included and stored in the reception history 546.

The ID handover control information 547 stores each location on the track 1 to be used for handing over the train ID from the first ground apparatus 50 to the second ground apparatus 50. Specifically, in the ID handover control information 547, a boundary location with the adjacent control section 10, which determines a range of the corresponding control section 10, a tracking start location and a tracking end location that determine a range of the radio communication control region 70 of the own apparatus, a tracking end location of the ground apparatus 50 adjacent on the train coming-in side, and a tracking start location of the ground apparatus 50 adjacent on the train going-out side, are set. Further, in the ID handover control information 547, a ground apparatus ID of the adjacent ground apparatus 50 is set along with the above-mentioned locations.

2. Administrative Apparatus

Figure 13:
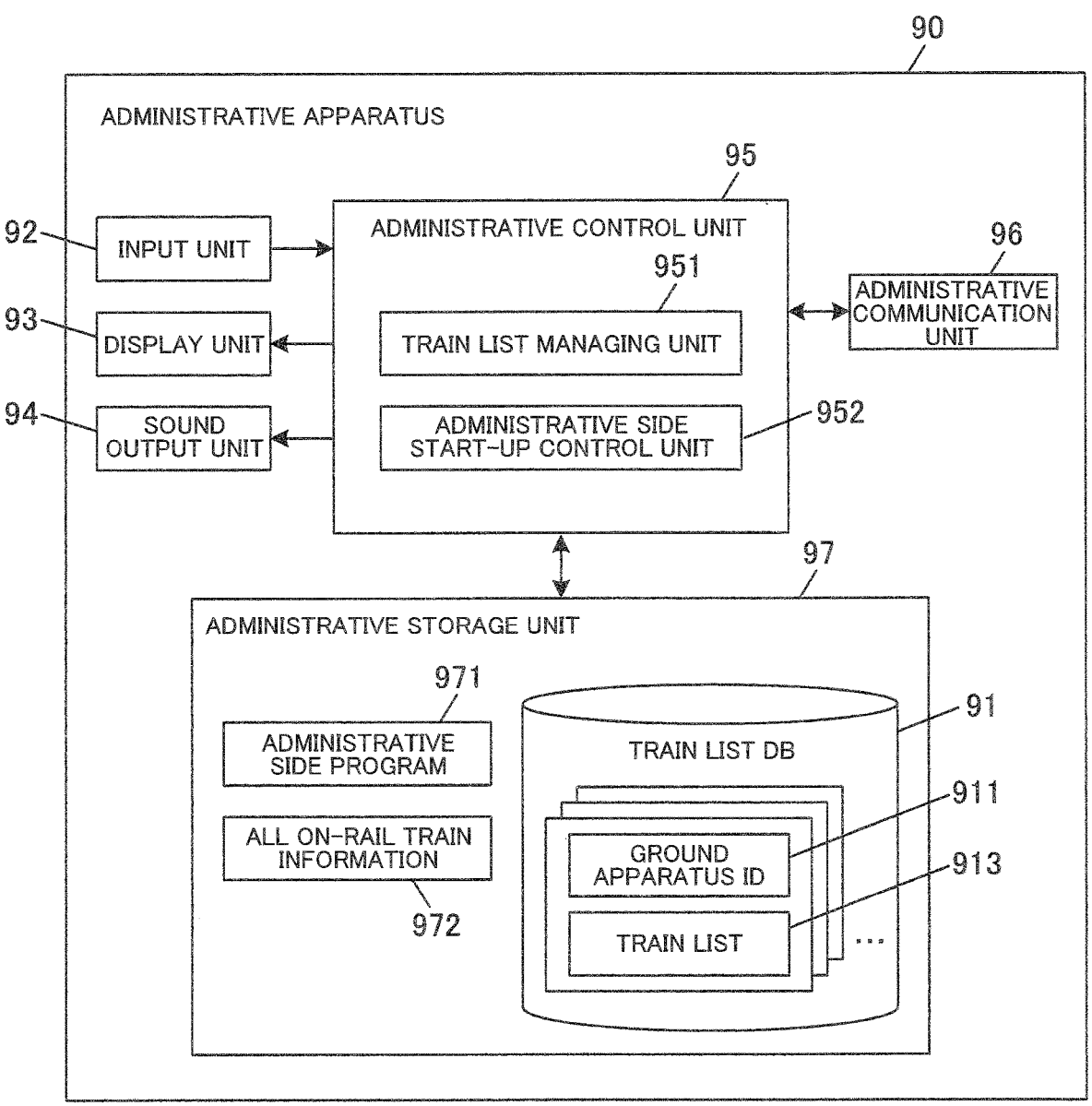
FIG. 13 illustrates a block diagram of a functional configuration example of an administrative apparatus.

FIG. 13 illustrates a block diagram of a functional configuration example of the administrative apparatus 90. As illustrated in FIG. 13, the administrative apparatus 90 is one type of a computer control system including an input unit 92, a display unit 93, a sound output unit 94, an administrative control unit 95, an administrative communication unit 96 and an administrative storage unit 97.

The input unit 92 is an input apparatus that is implemented with, for example, a keyboard, a mouse, a touch panel, various kinds of switches, or the like, and outputs an operation signal in accordance with operation input to the administrative control unit 95. The display unit 93 is a display apparatus that is implemented with, for example, an LCD (Liquid Crystal display), or the like, and performs display in accordance with a display signal from the administrative control unit 95. The sound output unit 94 is a sound output apparatus that is implemented with, for example, a speaker, or the like, and performs sound output in accordance with a sound signal from the administrative control unit 95.

The administrative control unit 95 is implemented with an arithmetic apparatus such as, for example, a CPU, and comprehensively controls operation of the administrative apparatus 90 by issuing an instruction and transferring data to respective components constituting the administrative apparatus 90 on the basis of programs and data stored in the administrative storage unit 97, and data, or the like, received from the ground apparatus 50. The administrative control unit 95 includes a train list managing unit 951 and an administrative side start-up control unit 952.

The train list managing unit 951 manages the latest train lists transmitted from the ground apparatuses 50 for each of all the ground apparatuses 50 as the train list DB 91.

In the case where the administrative side start-up control unit 952 receives preparation completion signals from the ground apparatuses 50 to be started up upon start-up of the ground apparatuses, the administrative side start-up control unit 952 checks reply receipt train IDs included in the preparation completion signals against the all on-rail train information 972, and transmits an operation permission signal to each ground apparatus 50.

The administrative communication unit 96 is a wired or wireless communication apparatus that is implemented with, for example, a wireless communication module, a router, a modem, a TA, a jack of a wired communication cable, a control circuit, or the like, and performs communication with external apparatuses (in the present embodiment, the ground apparatus 50).

The administrative storage unit 97 is implemented with a storage medium such as an IC memory, a hard disk and an optical disk. In the administrative storage unit 97, programs for causing the administrative apparatus 90 to operate and realizing various functions provided at the administrative apparatus 90, and data, or the like, to be used during execution of the programs, are stored. In the present embodiment, in the administrative storage unit 97, an administrative side program 971, the all on-rail train information 972 and the train list DB 91 are stored.

The administrative control unit 95 realizes functions of the train list managing unit 951, the administrative side start-up control unit 952, or the like, by reading out and executing the administrative side program 971 from the administrative storage unit 97.

The all on-rail train information 972 stores train IDs of all the trains 2 actually traveling. The train list DB 91 stores the latest train list 913 backed up from each ground apparatus 50 in association with the ground apparatus ID 911. Further, date and time at which the train list 913 is transmitted from the ground apparatus 50 is stored in association with the train list 913.

3. On-Board Apparatus

Figure 14:
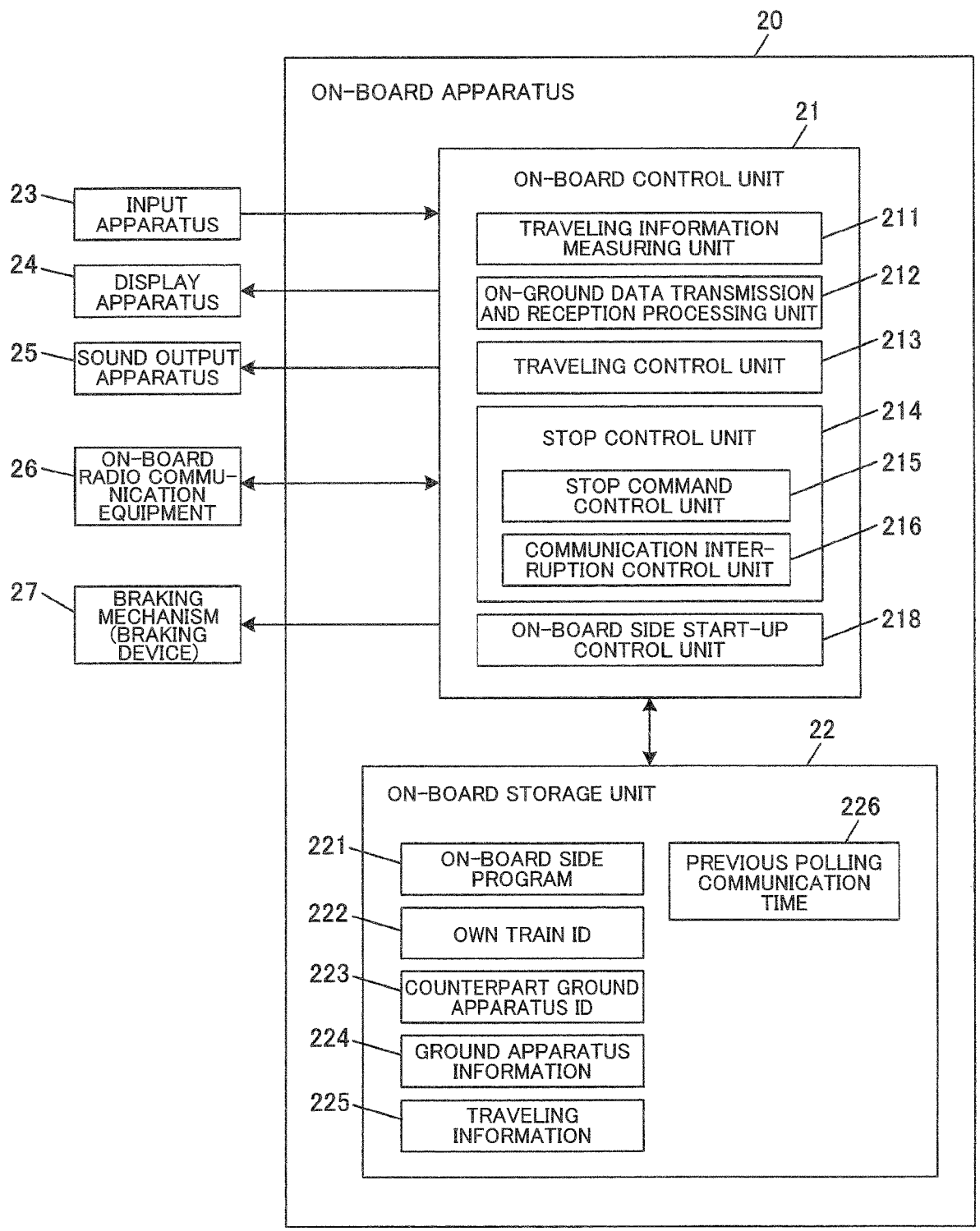
FIG. 14 illustrates a block diagram of a functional configuration example of an on-board apparatus.

FIG. 14 illustrates a block diagram of a functional configuration example of the on-board apparatus 20. As illustrated in FIG. 14, the on-board apparatus 20 is one type of a computer control apparatus configured to include an on-board control unit 21 and an on-board storage unit 22, and is connected to an input apparatus 23, a display apparatus 24, a sound output apparatus 25, on-board radio communication equipment 26, a braking mechanism (braking device) 27, or the like. Note that the range of the on-board apparatus 20 may be enlarged and may, of course, include the input apparatus 23, the display apparatus 24, the sound output apparatus 25 and the on-board radio communication equipment 26.

The on-board control unit 21 is configured to include an arithmetic apparatus and an arithmetic circuit such as, for example, a CPU and an FPGA, and comprehensively controls operation of the on-board apparatus 20 by issuing an instruction and transferring data to respective components constituting the on-board apparatus 20 on the basis of programs and data stored in the on-board storage unit 22, and data, or the like, received from the ground apparatus 50. The on-board control unit 21 includes a traveling information measuring unit 211, an on-ground data transmission and reception processing unit 212, a traveling control unit 213, a stop control unit 214 and an on-board side start-up control unit 218. Each functional unit provided at the on-board control unit 21 may be implemented with individual arithmetic circuits or may be individually implemented by the arithmetic circuits through software arithmetic processing.

The traveling information measuring unit 211 measures a location (a travel distance expressed with mileage) and speed of the own train as needed using rotation speed of an axle counted by the speed generator. Further, in place of a measurement value of the speed generator or in conjunction with the measurement value of the speed generator, the location and the speed of the own train may be measured using a measurement value by a satellite positioning system such as a GPS (Global Positioning System).

The on-ground data transmission and reception processing unit 212 performs control of receiving the ground information transmitted by the ground apparatus 50 through polling communication, which is the ground information in which the destination train ID is an own train ID 222 via the on-board radio communication equipment 26. Then, in the case where the on-ground data transmission and reception processing unit 212 receives the ground information, the on-ground data transmission and reception processing unit 212 performs control of creating train information using the transmission source ground apparatus ID as the destination ground apparatus ID and transmits the train information via the on-board radio communication equipment 26.

The traveling control unit 213 performs traveling control of the own train as needed using the coming-in allowable range included in the ground information (the ground information in which the transmission source ground apparatus ID is a counterpart ground apparatus ID 223) received from the ground apparatus 50. Further, when the own train 2 is the boundary passing train 2 that comes closer to the boundary location P32, there is a case where ground information is received from a plurality of ground apparatuses 50. In such a case, traveling control is performed on the basis of the ground information from the ground apparatus 50 in which the traveling location of the own train 2 is set as the control section 10. Therefore, in the case where the own train 2 is the boundary passing train 2, because the control section 10 changes before and after the train 2 reaches the boundary location P32, the ground information to be used as reference for traveling control is switched. Note that traveling control itself can be realized using a publicly known technique, and, for example, traveling of the own train is controlled in accordance with a brake pattern in which a train stops at a stop position in accordance with the coming-in allowable range.

The stop control unit 214 includes a stop command control unit 215 and a communication interruption control unit 216, and performs control for stopping the own train.

The stop command control unit 215 stops the own train in response to a stop command signal from the ground apparatus 50. In the case where the stop command signal is a signal indicating an emergency stop, the stop command control unit 215 performs control of driving the braking mechanism 27 to actuate an emergency brake.

The communication interruption control unit 216 monitors a time period that has elapsed since polling communication was performed with the ground apparatus 50 last time. Then, in the case where a predetermined time period set in advance has elapsed without polling communication being performed with the ground apparatus 50, the communication interruption control unit 216 drives the braking mechanism 27 to perform predetermined emergency stop control.

When a vehicle is powered on upon start-up of the own train, the on-board side start-up control unit 218 performs predetermined stop control until a traveling permission signal is received from the ground apparatus 50. The stop control includes processing such as screen display of a message indicating stop and sound output of notification sound in addition to actual actuation of the braking mechanism 27. Further, also upon start-up of the ground apparatus 50, predetermined stop control is performed in a similar manner until a traveling permission signal is received from the ground apparatus 50.

The on-board storage unit 22 is implemented with a storage medium such as an IC memory, a hard disk and an optical disk. In the on-board storage unit 22, programs for causing the on-board apparatus 20 to operate and realizing various functions provided at the on-board apparatus 20, and data, or the like, to be used during execution of the programs are stored in advance, or temporarily stored every time processing is performed. In the present embodiment, in the on-board storage unit 22, an on-board side program 221, an own train ID 222, a counterpart ground apparatus ID 223, ground apparatus information 224, traveling information 225, previous polling communication time 226 and next ground apparatus normal communication flag 227 are stored.

The on-board control unit 21 realizes functions of the traveling information measuring unit 211, the on-ground data transmission and reception processing unit 212, the traveling control unit 213, the stop control unit 214, the on-board side start-up control unit 218, or the like, by reading out and executing the on-board side program 221 from the on-board storage unit 22. In the own train ID 222, the train ID of the own train is set.

In the counterpart ground apparatus ID 223, the ground apparatus ID of the counterpart ground apparatus 50 that is the ground apparatus 50 in the control section 10 in which the own train is located is set. The counterpart ground apparatus ID 223 is rewritten every time the own train reaches the boundary location of the control section 10. The boundary location with the next control section 10 and the ground apparatus ID of the next ground apparatus 50 that newly becomes the counterpart ground apparatus 50 can be specified from the ground apparatus information 224.

The ground apparatus information 224 stores a list of ground apparatuses 50 disposed along the track 1. FIG. 15 illustrates a data configuration example of the ground apparatus information 224. As illustrated in FIG. 15, in the ground apparatus information 224, a range of the corresponding control section 10 (the boundary location with the adjacent control section 10), and a tracking start location and a tracking end location (a range of the radio communication control region 70) of the corresponding ground apparatus 50 are set in association with the ground apparatus ID.

The traveling information 225 includes a location and speed of the own train, and is rewritten as needed with the latest location and speed measured by the traveling information measuring unit 211 as needed.

The previous polling communication time 226 stores time at which polling communication is performed with the ground apparatus 50 last time.

Processing Flow

The processing flow of the ground apparatus 50, the administrative apparatus 90 and the on-board apparatus 20 in the present embodiment will be described below. Note that processing that will be described below is realized by the ground control unit 52 reading out and executing the ground side program 541 from the ground storage unit 54 at the ground apparatus 50, the administrative control unit 95 reading out and executing the administrative side program 971 from the administrative storage unit 97 at the administrative apparatus 90, and the on-board control unit 21 reading out and executing the on-board side program 221 from the on-board storage unit 22 at the on-board apparatus 20.

First, overall processing flow performed by each ground apparatus 50 will be described with reference to FIG. 16. When the ground apparatus 50 is started up, first, the ground side start-up control unit 528 transmits a train list distribution request to the administrative apparatus 90 (step a1), and processing shifts to ground side start-up control processing (step a3). Details of the ground side start-up control processing will be described later.

Figure 17:
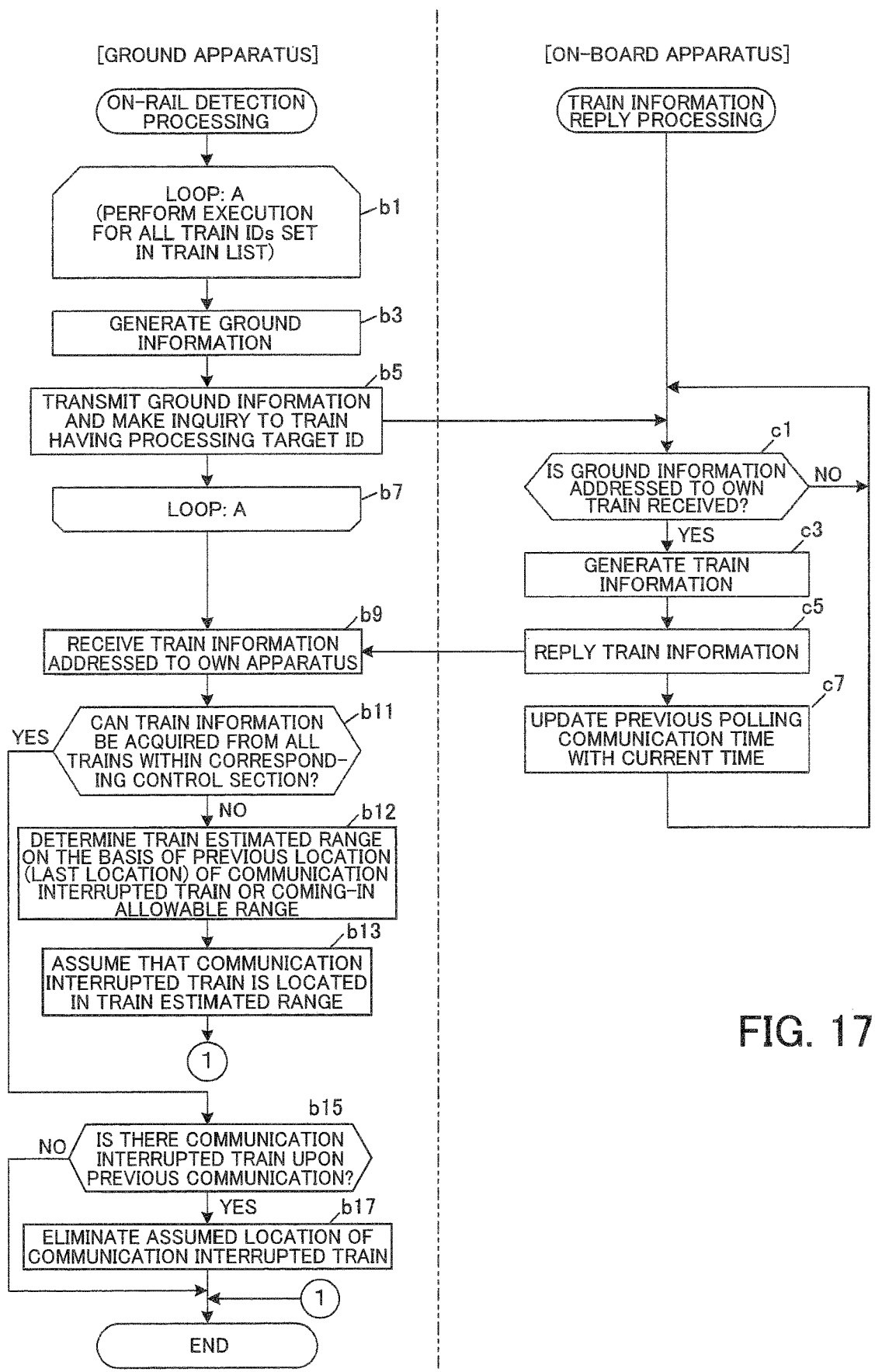
FIG. 17 illustrates a flowchart of on-rail detection processing of the ground apparatus and train information reply processing of the on-board apparatus in accordance with the on-rail detection processing.

If the ground side start-up control processing is finished, subsequently, on-rail detection processing is started (step a5). FIG. 17 illustrates a flowchart of on-rail detection processing performed by each ground apparatus 50 and train information reply processing of the on-board apparatus 20 associated with the on-rail detection processing. The ground apparatus 50 repeatedly performs the on-rail detection processing illustrated in FIG. 17 with a predetermined inquiry period.

In the on-rail detection processing, first, the train location detection processing unit 521 repeats processing of loop A sequentially using all the train IDs set in the train list 543 as a processing target ID, and performs one-time polling communication (step b1 to step b7). That is, the train location detection processing unit 521 generates ground information to be transmitted to the corresponding train 2 by setting the processing target ID as the destination train ID and setting the own apparatus ID 542 as the transmission source ground apparatus ID (step b3). At this time, the train control information generating unit 523 calculates and sets the coming-in allowable range of the corresponding train 2 and puts the coming-in allowable range in the ground information that is the train control information. In the case where there is a communication interrupted train, the coming-in allowable range of the corresponding train 2 is calculated and set using the train estimated range for the communication interrupted train. Then, the train location detection processing unit 521 makes an inquiry to the train 2 having the processing target ID by transmitting the generated ground information via the radio base station 51 (step b5).

Every time the inquiry is made, at the on-board apparatus 20, the on-ground data transmission and reception processing unit 212 performs train information reply processing. That is, the on-ground data transmission and reception processing unit 212 performs control of receiving ground information addressed to the own train from the ground apparatus 50. While the ground apparatus 50 that is the transmission source is the counterpart ground apparatus 50 in principle, in the case where the own train is passing through an overlapped region A3 illustrated in FIG. 6, the ground information from the next ground apparatus 50 can be exceptionally received. Then, in the case where polling communication by the ground apparatus 50 is performed, and the ground information addressed to the own train is received (step c1: Yes), the on-ground data transmission and reception processing unit 212 generates train information by reading out the location of the own train from the traveling information 225 and setting the location of the own train as train location information using the transmission source ground apparatus ID of the received ground information as the destination ground apparatus ID, and the own train ID 222 as the transmission source train ID (step c3). Then, the on-ground data transmission and reception processing unit 212 transmits the generated train information via the on-board radio communication equipment 26 (step c5).

Thereafter, the on-ground data transmission and reception processing unit 212 rewrites the previous polling communication time 226 with current time (step c7).

Meanwhile, at the ground apparatus 50, the train location detection processing unit 521 performs control of receiving train information addressed to the own apparatus (step b9). The train location information included in the received train information is added to the reception history 546 of the corresponding management target train location information 544 on the basis of the transmission source train ID. Then, in the case where train information can be acquired from all the trains 2 whose previous locations are within the corresponding control section 10 among the trains 2 to be managed (step b11: Yes), if there is no communication interrupted train 2 in the previous polling communication (step b15: No), polling communication in this inquiry period is finished. In the case where there is a communication interrupted train 2 in the previous polling communication (step b15: Yes), it is judged that communication can be restored through polling communication of this time, the assumed train estimated range of the communication interrupted train 2 is eliminated (step b17), and polling communication in this inquiry period is finished.

In contrast to this, in the case where there is a communication interrupted train 2 that does not respond to the inquiry in step b5 and that does not perform normal communication among the trains in the corresponding control section 10 (step b11: No), the communication interrupted train location estimating unit 522 determines a train estimated range of the communication interrupted train 2 on the basis of the previous location (the train location obtained through last communication) of the communication interrupted train 2 or the coming-in allowable range of the ground information transmitted to the communication interrupted train 2 in response to the last communication (step b12). Then, the communication interrupted train location estimating unit 522 finishes polling communication in this inquiry period assuming that there is a communication interrupted train 2 in the train estimated range determined in step b12 (step b13).

Returning to FIG. 16, after the on-rail detection processing is started in step a5, the train ID handover control unit 526 monitors a location of each train 2 to be managed that is acquired as needed through polling communication as the first ground apparatus 50. Then, if there is a train 2 that has reached the tracking start location P31 of the second ground apparatus 50 that is the ground apparatus adjacent on the train going-out side, the train 2 is detected as the boundary passing train 2 that comes closer to the boundary location P32 (step a7: Yes), and processing shifts to train ID handover control processing (step a9). Meanwhile, in the case where the own apparatus is powered off (step a11: Yes) such as in the case where operation of all the trains of the day is finished, the train list backup processing unit 527 transmits a backup notification to which the train list 543 is attached to the administrative apparatus 90 (step a13). Thereafter, the ground apparatus 50 is shut down.

Figure 18:
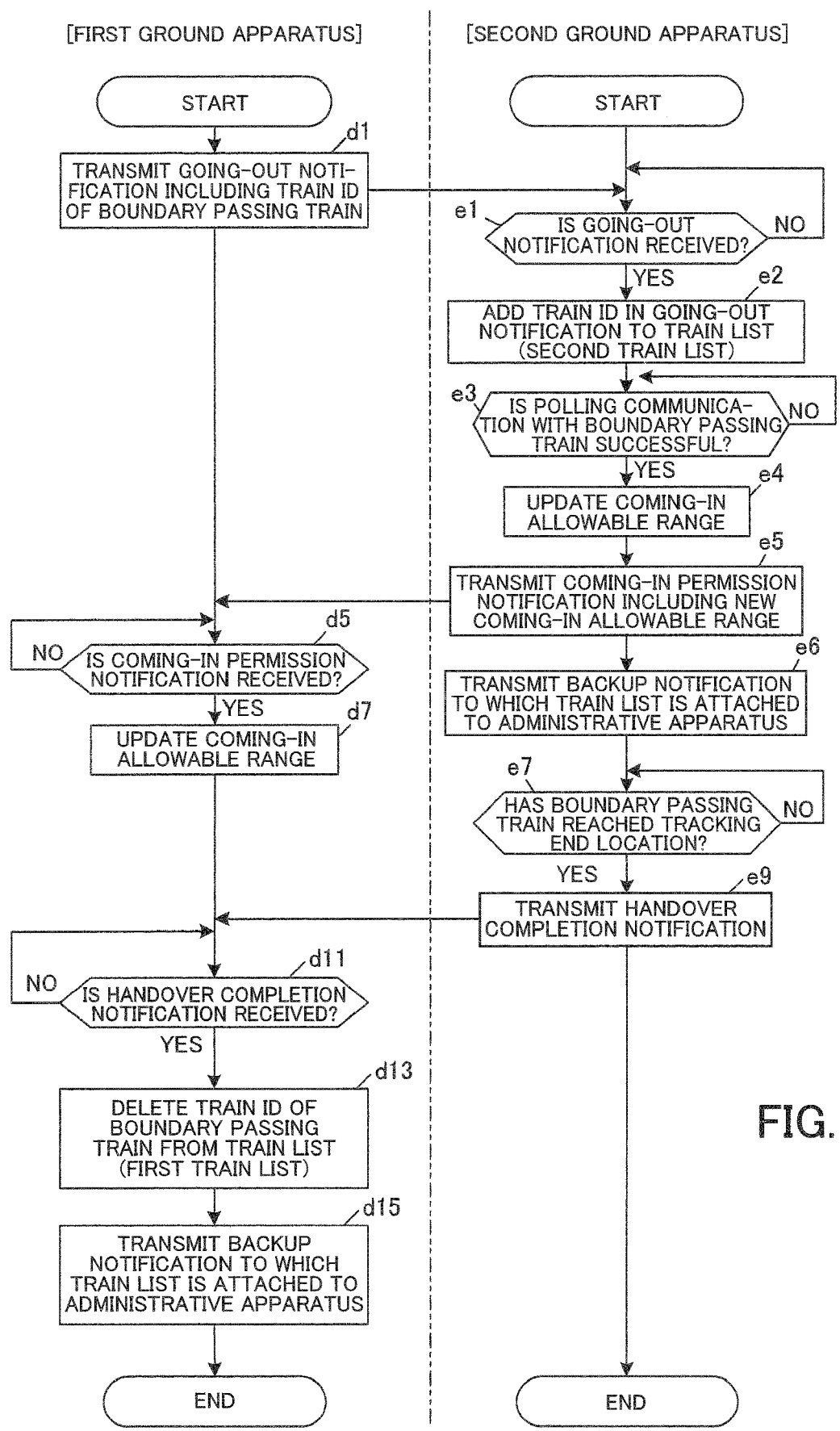
FIG. 18 illustrates a flowchart of train ID handover control processing of the ground apparatus.

FIG. 18 illustrates a flowchart of the train ID handover control processing performed by each ground apparatus 50. Note that FIG. 18 illustrates processing performed by the ground apparatus 50 as the first ground apparatus 50 and processing performed as the second ground apparatus 50 side by side. Each ground apparatus 50 performs processing of the first ground apparatus 50 (processing on the left side in FIG. 18) in the case where the train goes out from the control section 10 of the own apparatus and performs processing of the second ground apparatus 50 (processing on the right side in FIG. 18) in the case where the train comes in the control section 10 of the own apparatus, although the ground apparatuses are the same ground apparatuses 50.

Figure 16:
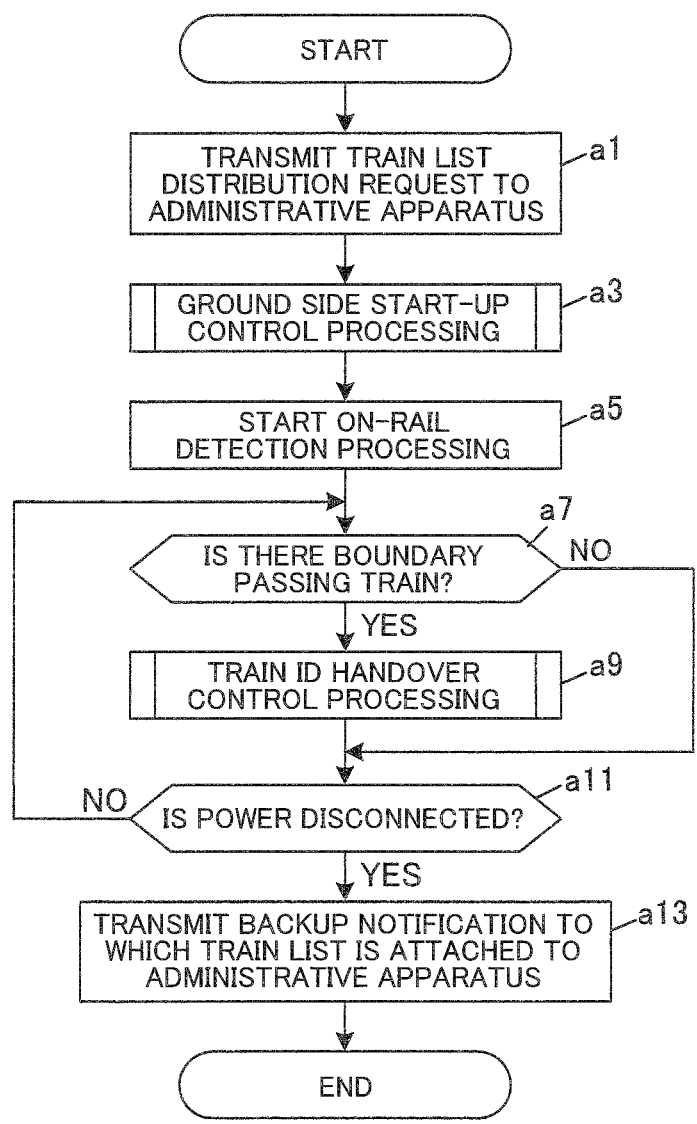
FIG. 16 illustrates a flowchart of overall processing of the ground apparatus.

That is, first, in the case where the boundary passing train 2 is detected in step a7 in FIG. 16, the train ID handover control unit 526 transmits a going-out notification including the train ID to the second ground apparatus 50 (step d1).

Then, at the second ground apparatus 50, the train ID handover control unit 526 adds the train ID in the going-out notification to the train list (second train list) 543 (step e2) in response to the going-out notification from the first ground apparatus 50 (step e1: Yes). In accordance with addition to the train list 543, the second ground apparatus 50 tries to perform polling communication with the boundary passing train 2. The coming-in allowable range to be included in the ground information to be transmitted through polling communication of this time is the boundary location P32. Then, in the case where polling communication is successful (step e3: Yes), the coming-in allowable range with respect to the boundary passing train 2 is updated to a given location ahead of the boundary location P32 in the traveling direction (step e4).

Further, because polling communication is successful, a coming-in permission notification including information of the updated coming-in allowable range is transmitted to the first ground apparatus 50 (step e5). Further, the train list backup processing unit 527 transmits the updated train list 543 to the administrative apparatus 90 along with a backup notification (step e6).

Meanwhile, in the case where the first ground apparatus 50 receives the coming-in permission notification from the second ground apparatus 50 (step d5: yes), the first ground apparatus 50 updates the coming-in allowable range to be included in the ground information to the boundary passing train 2 to a new coming-in allowable range designated in the received coming-in permission notification (step d7). By this means, the boundary passing train 2 can come in the control section 10 of the second ground apparatus 50.

Thereafter, in the case where the train ID handover control unit 526 of the second ground apparatus 50 determines that the boundary passing train 2 has reached the tracking end location P33 from the train location information included in the train information of the boundary passing train 2 received through polling communication (step e7: yes), the train ID handover control unit 526 determines that the boundary passing train 2 has come in the corresponding control section 10 of the second ground apparatus 50 and transmits a handover completion notification including the train ID of the boundary passing train 2 to the first ground apparatus 50 (step e9).

The train ID handover control unit 526 of the first ground apparatus 50 that receives the handover completion notification deletes the train ID of the boundary passing train 2 included in the handover completion notification from the train list (first train list) 543 (step d11: Yes ->step d13). Thereafter, the train list backup processing unit 527 transmits the train list 543 updated in step d13 to the administrative apparatus 90 along with a backup notification (step d15).

Figure 19:
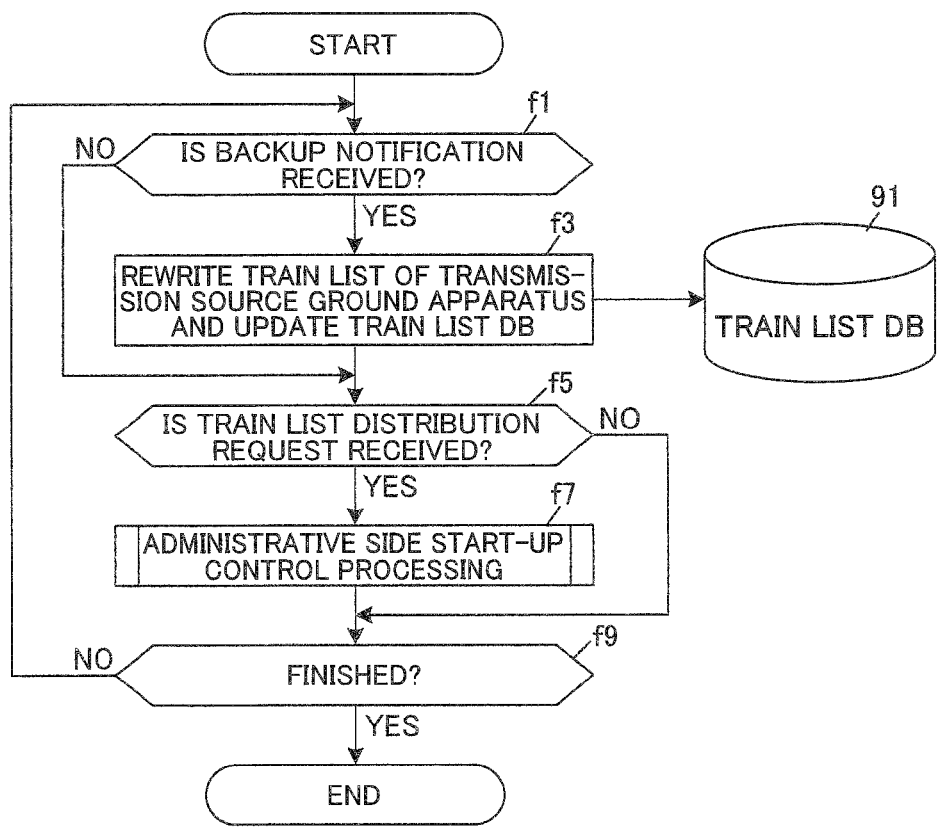
FIG. 19 illustrates a flowchart of overall processing of the administrative apparatus.

Overall processing flow performed by the administrative apparatus 90 will be described next. FIG. 19 illustrates a flowchart of overall processing of the administrative apparatus 90. As illustrated in FIG. 19, at the administrative apparatus 90, when the backup notification transmitted by the ground apparatus 50 at an arbitrary timing such as step d15 and step e6 in FIG. 18 (step f1: Yes), the train list managing unit 951 updates the train list DB 91 by rewriting a train list 913 associated with a ground apparatus ID 911 of the transmission source with the train list attached to the backup notification (step f3).

Further, at the administrative apparatus 90, in response to the train list distribution request transmitted by the ground apparatus 50 in step a1 in FIG. 16 (step f5: Yes), the administrative side start-up control unit 952 performs administrative side start-up control processing (step f7). At this time, the administrative apparatus 90 sets the ground apparatus 50 that transmits the train list distribution request as a start-up target ground apparatus 50. Upon start-up of the ground apparatus system 30, because train list distribution requests are transmitted from all the ground apparatuses 50, all the ground apparatuses 50 are set as the start-up target ground apparatuses 50, and, in the case where a train list distribution request is received from a certain ground apparatus 50 (upon individual start-up), the certain ground apparatus 50 is set as the start-up target ground apparatus 50.

Figure 20:
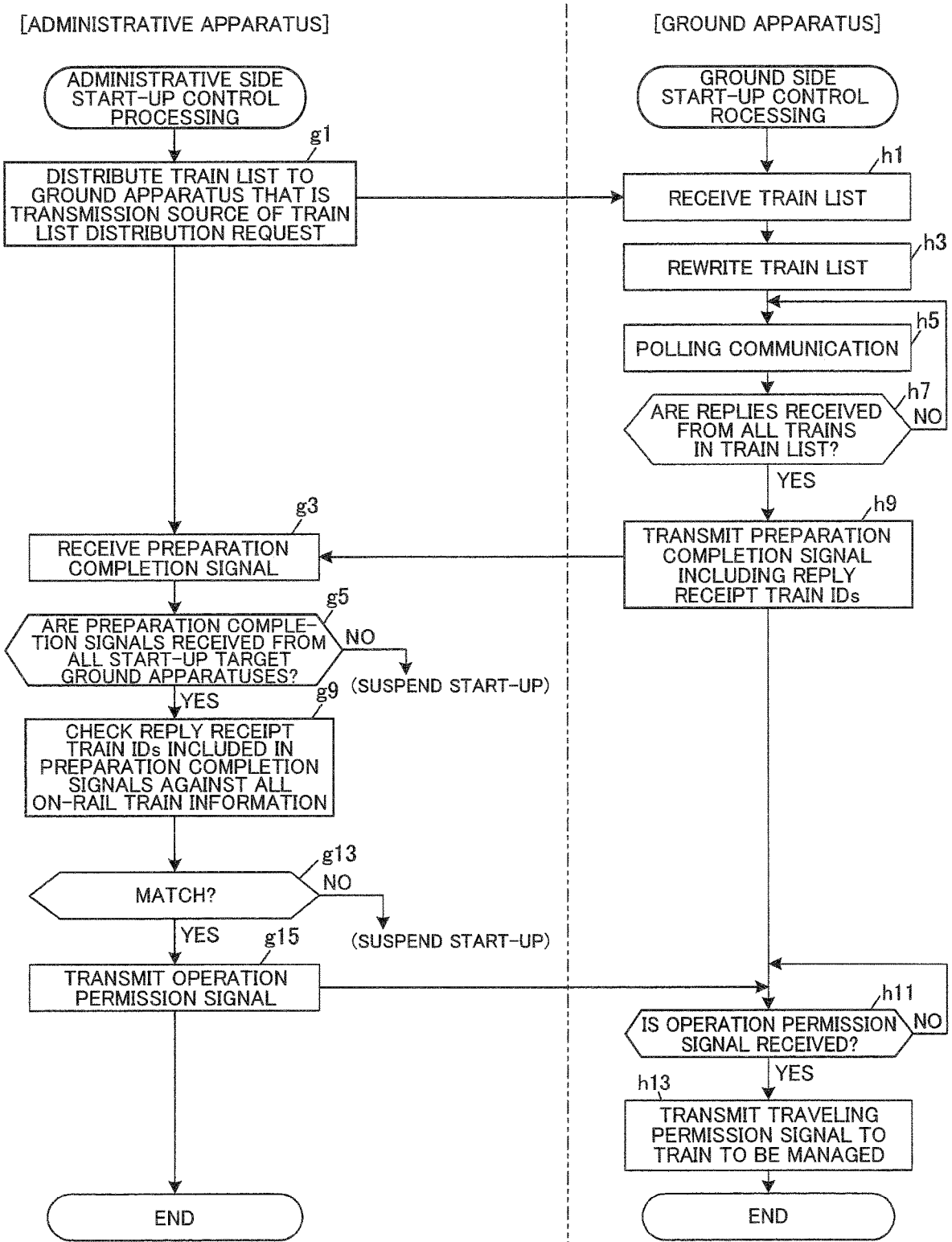
FIG. 20 illustrates a flowchart of administrative side start-up control processing of the administrative apparatus and ground side start-up control processing of the ground apparatus, which are illustrated side by side.

Here, administrative side start-up control processing will be described along with ground side start-up control processing to be performed by the ground apparatus 50. FIG. 20 illustrates a flowchart of the administrative start-up control processing to be performed by the administrative apparatus 90 and the ground side start-up control processing to be performed by the ground apparatus 50 side by side.

In the administrative side start-up control processing, first, the administrative side start-up control unit 952 reads out the train list 543 of the ground apparatus 50 of the transmission source from the train list DB 91 in response to the train list distribution request in step f5 in FIG. 19 and distributes the train list 543 to the ground apparatus 50 (step g1).

Then, at the ground apparatus 50, when the train list distributed from the administrative apparatus 90 is received (step h1), the ground side start-up control unit 528 rewrites the train list 543 with the received train list (step h3). Subsequently, the ground side start-up control unit 528 performs polling communication using the updated train list 543 (step h5). The processing described here is performed through procedure similar to that in polling communication in the on-rail detection processing (specifically, step b1 to step b9 in FIG. 17). However, in polling communication described here, the ground information and the train information to be transmitted and received include data for suspending train operation. Then, until replies from all the trains 2 in the train list 543 are received (step h7: No), processing returns to step h5, and polling communication is repeated. In the case where the system is started up, while the vehicle is powered on in the same time slot and the train 2 is also started up, there can be a case where a timing at which the train 2 is started up is later than a timing at which the ground apparatus 50 is started up. Polling communication is repeated to address such a case.

Then, in the case where replies are received from all the trains 2 and normal communication is performed (step h7: Yes), preparation completion signals including train IDs (reply receipt train IDs) of all the trains 2 to be managed that transmit the replies are transmitted to the administrative apparatus 90 (step h9).

In response to this, at the administrative apparatus 90, in response to the preparation completion signals from the ground apparatus 50 (step g3), it is determined whether or not preparation completion signals are received from all the start-up target ground apparatuses 50. In the case where there is a start-up target ground apparatus 50 from which a preparation completion signal has not been received yet, reception of the preparation completion signal is continuously accepted, while, in the case where preparation completion signals are received from all the start-up target ground apparatuses 50 (step g5: Yes), processing shifts to step g9. That is, the reply receipt train IDs included in the respective preparation completion signals are checked against the all on-rail train information 972. In the case where all the ground apparatuses 50 are set as the start-up target ground apparatuses 50 (upon start-up of the ground apparatus system 30), it is confirmed whether each of all the train IDs set in the all on-rail train information 972 is certainly included in one of the preparation completion signals as the replay receipt train ID. Meanwhile, in the case where a certain ground apparatus 50 is set as the start-up ground apparatus 50 (upon individual start-up of the ground apparatus 50), the train lists of the ground apparatuses other than the start-up target ground apparatus 50 are read out from the train list DB 91, and it is confirmed whether all the train IDs set in the all on-rail train information 972 are certainly included as the reply receipt train ID of the received preparation completion signal or the train IDs in the read train lists.

Then, in the case where the train IDs match the reply receipt train IDs or the train IDs in the train lists (step g13: Yes), an operation permission signal is transmitted to the start-up target ground apparatus 50 (step g15). Meanwhile, at the ground apparatus 50, when the operation permission signal is received (step h11: Yes), the ground side start-up control unit 528 transmits traveling permission signals to all the trains 2 to be managed (step h13). The traveling permission signals are transmitted by utilizing polling communication.

Figure 21:
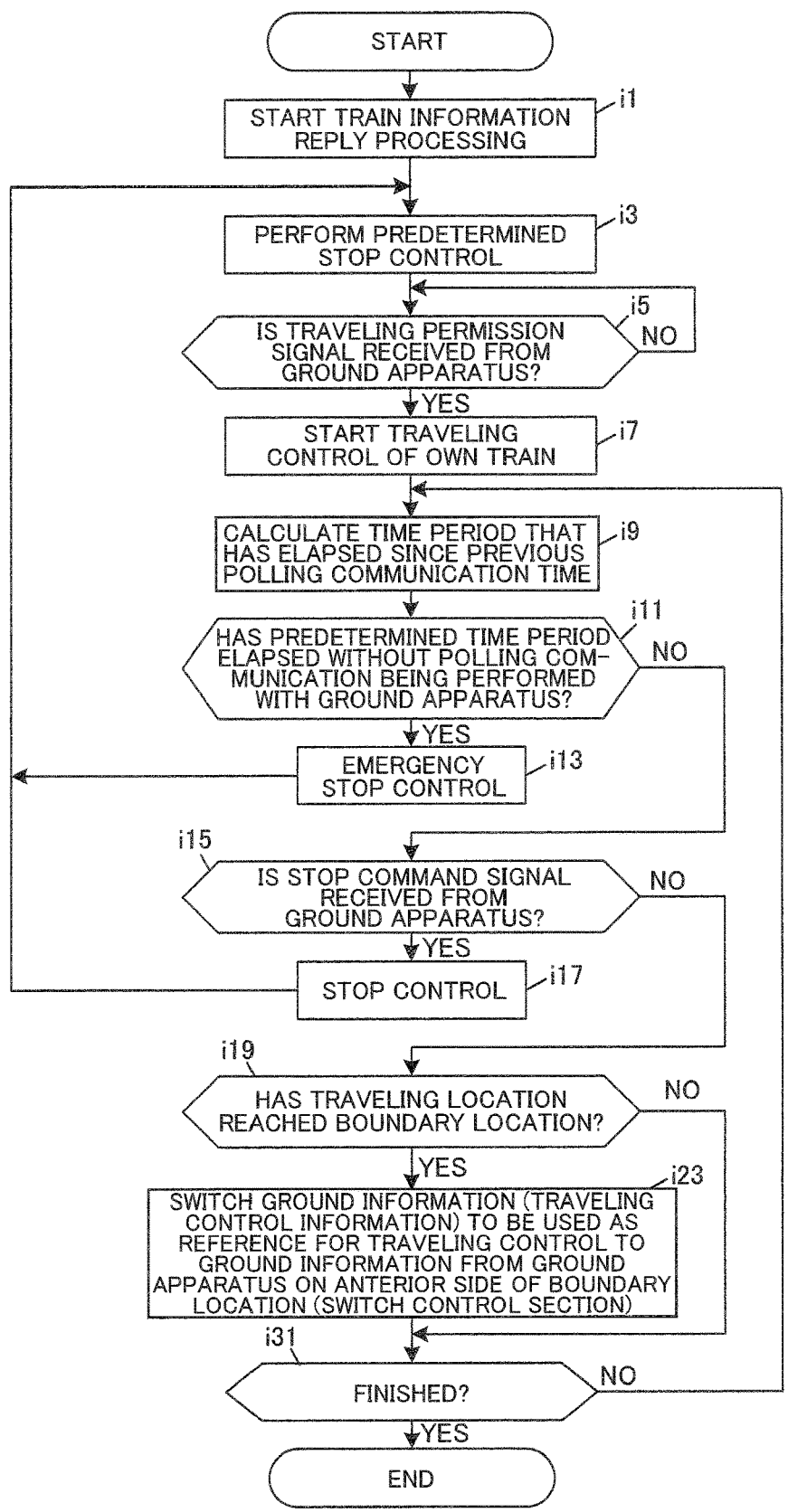
FIG. 21 illustrates a flowchart of overall processing of the on-board apparatus.

Overall processing flow to be performed by the on-board apparatus 20 will be described next with reference to FIG. 21. The on-board apparatus 20 starts processing illustrated in FIG. 21 upon start-up of the own train. That is, when the vehicle is powered on and the on-board apparatus 20 is activated, first, the on-ground data transmission and reception processing unit 212 starts train information reply processing illustrated in FIG. 17 (step i1). Further, the on-board side start-up control unit 218 performs predetermined stop control (step i3), the state becomes a standby state until a traveling permission signal is received from the ground apparatus 50 (step i5: No). Then, the traveling permission signal transmitted by the ground apparatus 50 in step h13 in FIG. 20 is received (step i5: Yes), and the traveling control unit 213 starts traveling control of the own train (step i7). That is, the traveling control unit 213 starts traveling control based on the latest ground information (train control information) received as needed through polling communication, and starts control of traveling speed and a brake so as not to travel beyond the coming-in limit location specified in the coming-in allowable range included in the ground information.

Thereafter, the stop control unit 214 performs stop control of the own train as necessary. Specifically, the communication interruption control unit 216 calculates a time period that has elapsed from the previous polling communication time 226 (step i9). The communication interruption control unit 216 then drives the braking mechanism 27 to perform predetermined emergency stop control (step i13) in the case where the calculated elapsed time period exceeds a predetermined time period set in advance and a predetermined time period has elapsed without polling communication being performed with the ground apparatus 50 (step i11: Yes).

Further, in the case where a stop command signal transmitted from the ground apparatus 50 for some reasons is received (step i15: Yes), the stop command control unit 215 drives the braking mechanism 27 to perform stop control of the own train (step i17).

In the case where stop control is performed in step i13 or step i17, processing shifts to step i3, and the state becomes a standby state until a traveling permission signal is received.

Further, there is a case where the own train is a boundary passing train 2, and receives the ground information from a plurality of ground apparatuses 50 while passing through the overlapped region A3. In this case, the ground information to be used as reference for traveling control is switched in accordance with whether or not the traveling location crosses over the boundary location and comes in the new control section 10. That is, in the case where the traveling location has reached the boundary location (step i19), the ground information (train control information) to be used as reference for traveling control is switched to the ground information of the control section 10 which the train 2 newly comes in by being switched to the ground information from the ground apparatus 50 ahead of the boundary location in the traveling direction (step i23). Note that the traveling control is started in step i7.

Then, until the present processing is finished such as until the on-board apparatus 20 is shut down in association with end of the operation (step i31: No), processing returns to step i9, and the above-described processing is repeated.

As described above, according to the present embodiment, by repeating polling communication with a predetermined inquiry period using the train list 543 while maintaining a state where the train IDs of all the trains 2 on the track 1 are set in the train list 543 of one of the ground apparatuses 50, each ground apparatus 50 can detect on-rail of the trains 2 in unit of control section 10. Therefore, it is possible to realize on-rail train management through radio communication without train detection means different from radio communication being provided on the ground.

Note that, while the train ID of the boundary passing train 2 is temporarily set in the train lists of the first ground apparatus 50 and the second ground apparatus 50 in an overlapped manner upon roaming, in a boundary portion of the control sections 10 in which the radio communication control regions 70 overlap with each other, both the first ground apparatus 50 and the second ground apparatus 50 track the boundary passing train 2, so that reliable handover can be realized.

In the case where there is a communication interrupted train 2 that does not perform normal communication as a result of polling communication repeatedly performed using the train list 543, the ground apparatus 50 calculates and sets the coming-in allowable range of each train 2 assuming that there is a communication interrupted train at the last train location acquired through polling communication with the communication interrupted train 2 or within the coming-in allowable range of the communication interrupted train. Meanwhile, stop control is performed on the communication interrupted train 2 because polling communication is interrupted. Therefore, even in the case where communication interruption occurs, it is possible to realize reliable and safe on-rail train management.

Further, each ground apparatus 50 backs up the train list 543 by transmitting the train list 543 to the administrative apparatus 90 as needed. Then, when the ground apparatus 50 is started up, the ground apparatus 50 can receive distribution of the train list that is backed up last time from the administrative apparatus 90 and reset the train list 543 to the original state. Moreover, it is possible to confirm whether the reset train list 543 appropriately corresponds to an on-rail state of the trains 2 in the corresponding control section 10. According to this, it is possible to prevent a case where operation is started/restarted although the train list 543 does not match the actual on-rail state.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A train control system comprising a first ground apparatus and a second ground apparatus that are disposed along a track for performing radio communication with a train,
the first ground apparatus and the second ground apparatus being disposed so that a first radio communication control region of the first ground apparatus and a second radio communication control region of the second ground apparatus partially overlap with each other in a portion including a boundary location, in order to prevent occurrence of a non-communication zone in the radio communication with the train that passes through the boundary location,
the first ground apparatus including:
a first storage unit that stores a first train list that is a list of train identification information of trains to be managed with which the first ground apparatus can perform communication through the radio communication, and the boundary location;
a first train control unit that determines a train location of each train included in the first train list by performing the radio communication, generates first traveling control information in which a range to the boundary location is set as a coming-in allowable range of a boundary passing train that comes closer to the boundary location until a coming-in permission notification is input from the second ground apparatus, and a given location designated in the coming-in permission notification is set as the coming-in allowable range after the coming-in permission notification is input, and transmits the first traveling control information to the boundary passing train; and
a going-out train control unit that notifies the second ground apparatus of a going-out notification including train identification information of the boundary passing train and deletes the train identification information of the boundary passing train from the first train list in a case where the boundary passing train has reached a given tracking end location determined ahead of the boundary location in a traveling direction,
the second ground apparatus including:
a second storage unit that stores a second train list that is a list of train identification information of trains to be managed with which the second ground apparatus can perform communication through the radio communication, and the boundary location;
a coming-in train control unit that adds the train identification information of the boundary passing train to the second train list in a case where the going-out notification is input from the first ground apparatus and notifies the first ground apparatus of the coming-in permission notification in a case where the radio communication is successful with the boundary passing train; and
a second train control unit that determines a train location of each train included in the second train list by performing the radio communication, generates second traveling control information in which the given location ahead of the boundary location in the traveling direction is determined as the coming-in allowable range of the boundary passing train and transmits the second traveling control information to the boundary passing train, and
the boundary passing train including:
a measuring unit that measures a train location; and
a traveling control unit that performs traveling control based on the first traveling control information until the train location has reached the boundary location and performs traveling control based on the second traveling control information after the train location has reached the boundary location.

2. The train control system according to claim 1,
wherein, in a case where the second traveling control information cannot be received until the boundary passing train passes through the boundary location, the traveling control unit of the boundary passing train performs stop control while setting the boundary location as a coming-in limit on the basis of the first traveling control information.

3. The train control system according to claim 1,
wherein the radio communication is polling communication in which the first ground apparatus and the second ground apparatus are set as primary stations, and the train is set as a secondary station, and
the traveling control unit of the boundary passing train performs stop control in a case where the polling communication is not performed with the first ground apparatus until the boundary passing train has passed through the boundary location and performs stop control in a case where the polling communication is not performed with the second ground apparatus after the boundary passing train has passed through the boundary location.

4. The train control system according to claim 2,
wherein the radio communication is polling communication in which the first ground apparatus and the second ground apparatus are set as primary stations, and the train is set as a secondary station, and
the traveling control unit of the boundary passing train performs stop control in a case where the polling communication is not performed with the first ground apparatus until the boundary passing train has passed through the boundary location and performs stop control in a case where the polling communication is not performed with the second ground apparatus after the boundary passing train has passed through the boundary location.

* * * * *